(12) United States Patent
Chinta et al.

(10) Patent No.: US 11,989,231 B2
(45) Date of Patent: May 21, 2024

(54) AUDIO RECOMMENDATION BASED ON TEXT INFORMATION AND VIDEO CONTENT

(71) Applicant: SONY GROUP CORPORATION, Tokyo (JP)

(72) Inventors: Om Prakash Chinta, Bangalore (IN); Karthik Gayakwad, Bangalore (IN); Shehnaz Mohamed, Bangalore (IN); Karan Parikh, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 336 days.

(21) Appl. No.: 17/389,209

(22) Filed: Jul. 29, 2021

(65) Prior Publication Data
US 2023/0031056 A1 Feb. 2, 2023

(51) Int. Cl.
*G06F 16/683* (2019.01)
*G06F 16/635* (2019.01)
*G06F 16/68* (2019.01)
*G06F 16/783* (2019.01)

(52) U.S. Cl.
CPC .......... *G06F 16/685* (2019.01); *G06F 16/635* (2019.01); *G06F 16/686* (2019.01); *G06F 16/7834* (2019.01); *G06F 16/7837* (2019.01)

(58) Field of Classification Search
CPC ........ G06F 3/165; G06F 16/683; G06F 16/68; G06F 16/639; G06F 16/60; G11B 27/031
USPC .......................................................... 700/94
See application file for complete search history.

(56) References Cited

U.S. PATENT DOCUMENTS

| | | | |
|---|---|---|---|
| 9,135,333 B2 | 9/2015 | Cameron et al. | |
| 9,666,227 B2 | 5/2017 | Cameron et al. | |
| 11,050,694 B2* | 6/2021 | Rodriguez | H04L 65/1093 |
| 2013/0191861 A1* | 7/2013 | Sasaki | H04N 21/4316 725/32 |
| 2019/0005959 A1 | 1/2019 | Cameron et al. | |
| 2019/0213254 A1* | 7/2019 | Ray | G06N 3/045 |
| 2021/0397971 A1* | 12/2021 | Pardeshi | G06N 3/045 |

FOREIGN PATENT DOCUMENTS

| | | |
|---|---|---|
| CN | 110704682 A | 1/2020 |
| CN | 111259192 A | 6/2020 |

* cited by examiner

*Primary Examiner* — Alexander Krzystan
(74) *Attorney, Agent, or Firm* — CHIP LAW GROUP

(57) ABSTRACT

An electronic device and method for audio recommendation and generation are disclosed. The electronic device receives textual information that indicates a plurality of scenes for video content, and determines a first plurality of features for the plurality of scenes. The electronic device determines a set of positions in the textual information based on the determined first plurality of features. A set of audio files are to be inserted at the set of positions related to a set of scenes of the plurality of scenes. The electronic device determines, by an artificial intelligent (AI) engine, the set of audio files for the set of scenes, based on a second plurality of features and the first plurality of features related to the set of scenes. The electronic device controls a display device to display first information corresponding to the set of positions and second information corresponding to the set of audio files.

21 Claims, 12 Drawing Sheets

AUDIO RECOMMENDATION BASED ON TEXT INFORMATION AND VIDEO CONTENT

CROSS-REFERENCE TO RELATED APPLICATIONS/INCORPORATION BY REFERENCE

None

FIELD

Various embodiments of the disclosure relate to audio recommendation and generation. More specifically, various embodiments of the disclosure relate to an electronic device and method for audio recommendation and generation based on text information and video content.

BACKGROUND

Advancements in the field of information technology have led to development of various techniques for recommendation of audio content for media content (for example, a movie, a short video, television show, or a video game content). However, certain techniques may not typically provide satisfactory audio content recommendations for the media content. Thus, conventionally, a content creator (such as, a movie director, a musician, or a music director) and/or a content creation team may manually determine audio files (for example, a background music, a soundtrack, or a song) for addition to the media content under-production, to further enhance an appeal for an audience of the media content. The manual determination of the audio files for the media content may require a significant amount of effort and time on the part of the content creator and/or his/her team. The manual determination of the audio files for the media content may also cause delays in a release of the media content to the audience. Further, the delays in the release may lead to losses for a production company and/or distributors associated with the media content.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for audio recommendation based on text information and video content is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
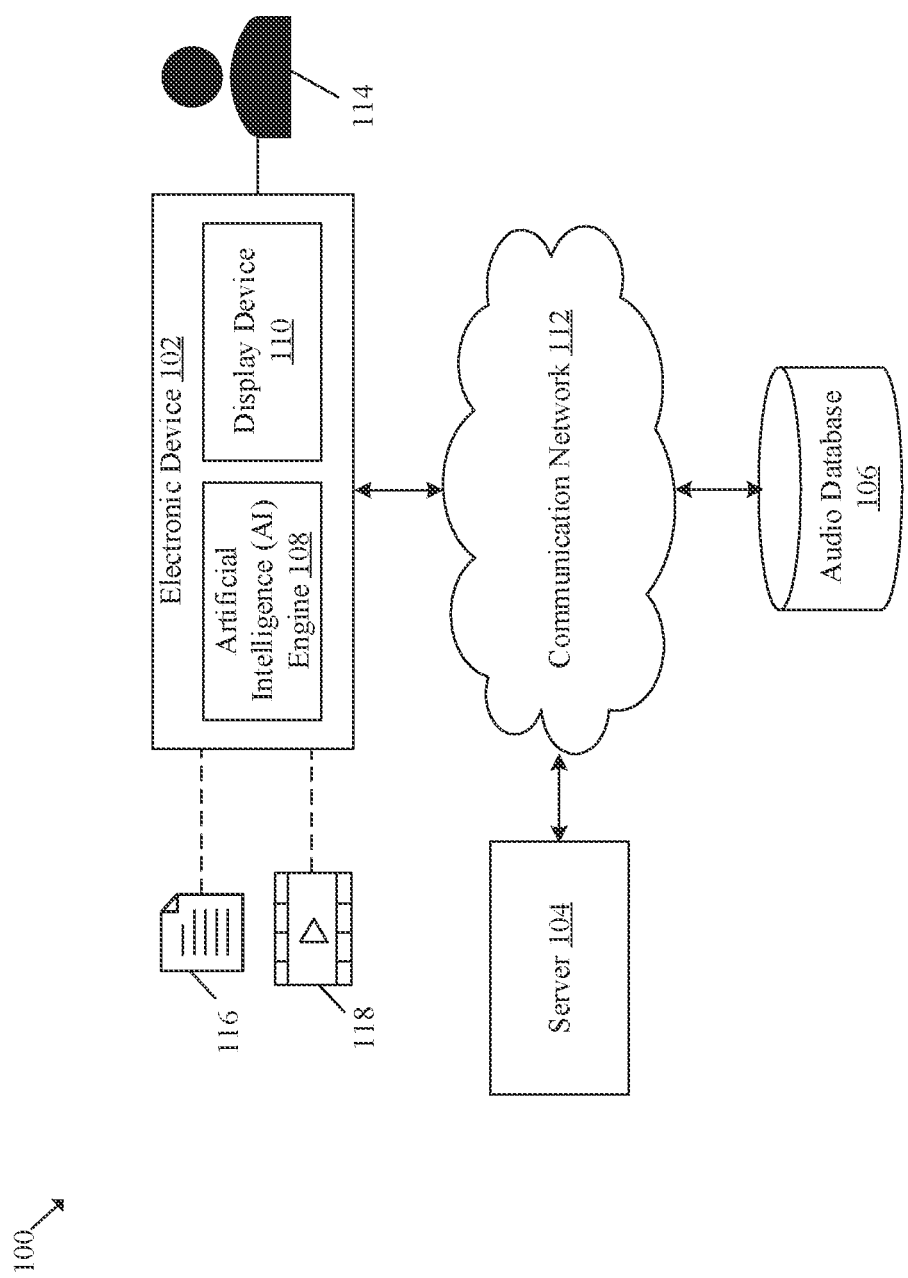
FIG. 1 is a block diagram that illustrates an exemplary network environment for audio recommendation based on text information and video content, in accordance with an embodiment of the disclosure.

The following described implementation may be found in the disclosed electronic device and method for audio recommendation and/or generation based on text information and/or video content. Exemplary aspects of the disclosure provide an electronic device, which may automatically recommend audio files (such as songs, background music) based on the text information (in textual form) and the video content. The electronic device may be configured to receive textual information (such as textual script information, textual feeds, or narrative text) that may indicate a plurality of scenes for video content and may be configured to determine a first plurality of features for the plurality of scenes indicated by the textual information. In an example, the first plurality of features for the plurality of scenes indicated by the textual information may include, but is not limited to, at least one of an occasion of a scene, an activity of the scene, a duration of the scene, a non-verbal scene, a transition of the scene, a prominent character in the scene, an introduction of the prominent character in the scene, a narration in the scene, or an audio-insertable position in the scene. The electronic device may be further configured to determine a first set of positions (i.e. audio placeholders) in the textual information (i.e. textual script information), based on the determined first plurality of features for the plurality of scenes. A set of audio files may be inserted at the determined first set of positions which are related to a first set of scenes of the plurality of scenes. In an example, the first set of positions may include, but is not limited to, at least one of a set of start positions and a set of end positions based on which the first set of audio files may be reproduced or played. The first set of audio files may include, but is not limited to, at least one of a background audio file, or a song audio file (like a foreground audio file). The electronic device may be further configured to automatically determine, by an artificial intelligent (AI) engine, the first set of audio files for the first set of scenes, based on a second plurality of features and the first plurality of features related to the first set of scenes. In an example, the second plurality of features related to the first set of scenes may include, but is not limited to, at least one of a pace or tempo of a scene, a genre of the scene, one or more characters (i.e., actors or actress) in the scene, a dialogue audio in the scene, a sentiment of the scene, a danceability of the scene, or a background ambience of the scene. The electronic device may be further configured to control a display device to display first information corresponding to the determined first set of positions in the textual information and second information corresponding to the determined first set of audio files.

In an embodiment, the electronic device may be configured to receive video content (such as, but is not limited to, a movie, a short video taken from a mobile/camera, a television show, or video game content) that may include a plurality of image frames associated with a plurality of scenes, and may be configured to determine one or more features from the plurality of image frames associated with the plurality of scenes of the received video content. The electronic device may be further configured to determine a second set of positions (i.e. audio placeholders) in the received video content based on the determined one or more features for the plurality of scenes. A second set of audio files may be inserted at the determined second set of positions which are related to a second set of scenes of the plurality of scenes in the video content. The electronic device may be further configured to automatically determine, by the AI engine, the second set of audio files for the second set of scenes of the plurality of scenes, based on the determined one or more features. The electronic device may be further configured to control a display device to display first information corresponding to the second set of positions in the received video content and second information corresponding to the determined second set of audio files that may be inserted at the second set of positions.

The disclosed electronic device may automatically recommend a set of positions within the textual information (such as textual script information, textual feeds, or narrative text) and/or the video content at which a set of audio files may be inserted. Based on the textual information and/or the video content, the disclosed electronic device may further automatically recommend a suitable set of audio files (like songs or background music) from a plurality of audio files stored in an audio database that may be inserted at the recommended set of positions. The insertion of the recommended set of audio files may enrich a set of scenes of media content associated with the textual information and/or the video content. In many scenarios, the media content may include a lengthy video (such as, a movie, a feature film, or a television show). In such scenarios, the automatic recommendations of the set of positions (in the media content) for audio insertion and the automatic recommendations of the suitable audio files to be inserted at such recommended positions may significantly reduce manual effort and time at a pre-production, production, or post-production stages. As manual effort and time involved in the audio selection and insertion may be reduced, the media content may be ready for release in a timely manner. Also, as the disclosed electronic device may enable a selection of the audio files for the media content at an early stage (e.g., at a pre-production or production stage), a production company and/or the distributors associated with the media content may have sufficient time to procure licenses from the creators of the audio files stored in the audio database. In addition, the selection of the audio files for the media content in the pre-product or production stage may provide a flexibility to the production company to tweak the media content based on the selected audio files, to further enhance the appeal of the media content to an audience. In another embodiment, the disclosed electronic device may automatically generate lyrics information for one or more audio files (i. e. to be inserted in the video content) based on one or more features determined from the first plurality of features and/or the second plurality of features extracted from the textual information (like script) and/or from the video content. The disclosed electronic device may automatically generate the one or more audio files based on the generated lyrics information.

FIG. 1 is a block diagram that illustrates an exemplary network environment for audio recommendation based on script information and video content, in accordance with an embodiment of the disclosure. With reference to FIG. 1, there is shown a network environment 100. The network environment 100 may include an electronic device 102, a server 104, and an audio database 106. The electronic device 102 may further include an artificial intelligence (AI) engine 108 and a display device 110. The electronic device 102, the server 104, and the audio database 106 may be communicatively coupled with each other, via a communication network 112. In the network environment 100, there is further shown a first user 114 associated with the electronic device 102. There is further shown textual information 116 that may indicate a plurality of scenes for video content, and video content 118 that may include a plurality of image frames associated with the plurality of scenes.

The electronic device 102 may include suitable logic, circuitry, interfaces, and/or code that may be configured to recommend audio files based on the textual information 116 (i.e., textual script, textual dialogues, monologues, a textual description, textual feeds, a textual narration, of the video content, like a movie, a short video, or television show) and/or the video content 118. The electronic device 102 may determine a set of positions in the textual information 116 (or in the video content 118) for insertion of a set of audio files in the textual information 116 and/or in the video content 118. The electronic device 102 may determine, by the AI engine 108, the set of audio files for a first set of scenes, based on a plurality of features related to the first set of scenes. The electronic device 102 may control the display device 110 to display first information corresponding to the set of positions (at which the set of audio files may be inserted in the textual information 116 and/or in the video content 118) and second information corresponding to the determined set of audio files. Examples of the electronic device 102 may include, but are not limited to, a movie editing machine, an audio recommendation engine, a computing device, a smartphone, a mobile phone, a tablet, a laptop, a gaming device, a mainframe machine, a server, a computer workstation, and/or a consumer electronic (CE) device.

The AI engine 108 may be trained on a recommendation task to determine the set of audio files for the first set of scenes, based on a second plurality of features and a first plurality of features related to the first set of scenes. For example, the AI engine 108 may be trained to determine the set of audio files for the first set of scenes from a plurality of audio files stored in the audio database 106, based on a matching operation that may compare one or more features from the first plurality of features and the second plurality of features with a third plurality of features of the plurality of audio files stored in the audio database 106. In an embodiment, the AI engine 108 may be implemented as a machine learning model. Examples of the machine learning model may include, but are not limited to, a regression model (such as, a multi-variate logistic or linear regression model), a decision tree model, a random forest, a gradient boosted tree, or a Naive Bayes.

In another embodiment, the AI engine 108 may be implemented as a deep learning model. The deep learning model may be defined by its hyper-parameters and topology/architecture. For example, the deep learning model may be a neural network-based model that may have number of nodes (or neurons), activation function(s), number of weights, a cost function, a regularization function, an input size, a learning rate, number of layers, and the like, as its hyper-parameters. Such a model may be referred to as a computational network or a system of nodes (for example, artificial neurons). For a deep learning implementation, the nodes of the deep learning model may be arranged in layers, as defined in a neural network topology. The layers may include an input layer, one or more hidden layers, and an output layer. Each layer may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the model. Outputs of each hidden layer may be coupled to inputs of at least one node in other layers of the deep learning model. Node(s) in the final layer may receive inputs from at least one hidden layer to output a result. The number of layers and the number of nodes in each layer may be determined from the hyper-parameters, which may be set before, while, or after training the deep learning model on a training dataset.

Each node of the deep learning model may correspond to a mathematical function (e.g., a sigmoid function or a rectified linear unit) with a set of parameters, tunable during training of the model. The set of parameters may include, for example, a weight parameter, a regularization parameter, and the like. Each node may use the mathematical function to compute an output based on one or more inputs from nodes in other layer(s) (e.g., previous layer(s)) of the deep learning model. All or some of the nodes of the deep learning model may correspond to same or a different same mathematical function.

In training of the deep learning model, one or more parameters of each node may be updated based on whether an output of the final layer for a given input (from the training dataset) matches a correct result based on a loss function for the deep learning model. The above process may be repeated for same or a different input till a minima of loss function is achieved, and a training error is minimized. Several methods for training are known in the art, for example, gradient descent, stochastic gradient descent, batch gradient descent, gradient boost, meta-heuristics, and the like.

In an embodiment, the AI engine 108 may include electronic data, such as, for example, a software program, code of the software program, libraries, applications, scripts, or other logic or instructions for execution by a processing device, such as the electronic device 102. The AI engine 108 may include code and routines configured to enable a computing device, such as the electronic device 102 to perform one or more operations for determination of the set of audio files. Additionally, or alternatively, the AI engine 108 may be implemented using hardware including, but is not limited to, a processor, a microprocessor (e.g., to perform or control performance of one or more operations), a field-programmable gate array (FPGA), or an application-specific integrated circuit (ASIC). Alternatively, in some embodiments, the trained AI engine 108 may be implemented using a combination of hardware and software. In certain embodiments, the AI engine 108 may be based on a hybrid architecture of multiple Deep Neural Networks (DNNs). Examples of the AI engine 108 may include, but are not limited to, a neural network model or a model based on one or more of regression method(s), instance-based method(s), regularization method(s), decision tree method(s), Bayesian method(s), clustering method(s), association rule learning, and dimensionality reduction method(s). Examples of the AI engine 108 may include a neural network model, such as, but are not limited to, an artificial neural network (ANN), a deep neural network (DNN), a convolutional neural network (CNN), a recurrent neural network (RNN), a CNN-recurrent neural network (CNN-RNN), R-CNN, Fast R-CNN, Faster R-CNN, a You Only Look Once (YOLO) network, a Residual Neural Network (Res-Net), a Feature Pyramid Network (FPN), a Retina-Net, a Single Shot Detector (SSD), and/or a combination thereof.

The display device 110 may include suitable logic, circuitry, and interfaces that may be configured to display an output of the electronic device 102. The display device 110 may be utilized to display the first information corresponding to the determined set of positions (i.e. first set of positions and/or the second set of positions) and the second information corresponding to the determined set of audio files (i.e. first set of audio files and/or second set of audio files). In some embodiments, the display device 110 may be an external display device associated with the electronic device 102. The display device 110 may be a touch screen which may enable the first user 114 to provide a user input via the display device 110. For example, the user input may be selection of one or more scenes (i.e. from the plurality of scenes) for which the set of audio files are to be inserted. In another example, the user input from the first user 114 may indicate one or more positions of the set of positions in the textual information 116 to insert recommended audio files. The touch screen may be at least one of a resistive touch screen, a capacitive touch screen, a thermal touch screen or any other touch screen using which inputs can be provided to the display device 110. The display device 110 may be realized through several known technologies such as, but are not limited to, at least one of a Liquid Crystal Display (LCD) display, a Light Emitting Diode (LED) display, a plasma display, or an Organic LED (OLED) display technology, or other display devices.

The server 104 may include suitable logic, circuitry, and interfaces, and/or code that may be configured to store the textual information 116 that indicates the plurality of scenes for video content. The server 104 may further store the video content 118 that includes a plurality of image frames associated with the plurality of scenes. In an exemplary embodiment, the server 104 may be implemented as a cloud server and may execute operations through web applications, cloud applications, HTTP requests, repository operations, file transfer, and the like. Other example implementations of the server 104 may include, but are not limited to, a database server, a file server, a content server, a web server, an application server, a mainframe server, or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102 as two separate entities. In certain embodiments, the functionalities of the server 104 can be incorporated in its entirety or at least partially in the electronic device 102, without a departure from the scope of the disclosure.

The audio database 106 may include suitable logic, interfaces, and/or code that may be configured to store the plurality of audio files out of which a set of audio files may be selected and retrieved by the electronic device 102. The features of the selected set of audio files may match to a larger extent with features of the textual information 116 and/or with features of the image frames of the video content 118. The disclosed electronic device 102, via the AI engine 108, may extract the features (i.e. third plurality of features) of the plurality of audio files stored in the audio database 106, to further determine the set of audio files for audio recommendation. In an embodiment, the audio database 106 may store a set of background audio files and a set of song audio files. The audio database 106 may be a relational or a non-relational database. Also, in some cases, the audio database 106 may be stored on a server, such as a cloud server or may be cached and stored on the electronic device 102. Additionally, or alternatively, the audio database 106 may be implemented using hardware including a processor, a microprocessor (e.g., to perform or control performance of one or more operations), a field-programmable gate array (FPGA), or an application-specific integrated circuit (ASIC). In some other instances, the audio database 106 may be implemented using a combination of hardware and software.

The communication network 112 may include a communication medium through which the electronic device 102, the server 104, and the audio database 106 may communicate with one another. Examples of the communication network 112 may include, but are not limited to, the Internet, a cloud network, a Wireless Local Area Network (WLAN), a Wireless Fidelity (Wi-Fi) network, a Personal Area Network (PAN), a Local Area Network (LAN), a telephone line (POTS), and/or a Metropolitan Area Network (MAN), a mobile wireless network, such as a Long-Term Evolution (LTE) network (for example, 4th Generation or 5th Generation (5G) mobile network (i.e., 5G New Radio)). Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

In operation, the electronic device 102 may receive a user input, for example, to turn-on the electronic device 102 or to activate a recommendation mode in which the electronic device 102 may recommend a set of audio files (i.e. the first set of audio files and/or the second set of audio files) based on the textual information 116 and/or the video content 118.

At any time-instant, the electronic device 102 may configured to receive the textual information 116 that may indicate a plurality of scenes for the video content 118. The textual information 116 may be a text script corresponding to a screenplay, a textual description, a manuscript, a textual feed, a textual narration, or dialogues (e.g., of a movie, a feature film, a short video, video game content, or a television show). The textual information 116 may correspond to a plurality of scenes and dialogues related to the video content 118. For example, if the textual information 116 is associated with a television program, then the textual information 116 may include information corresponding to a plurality of scenes for the television program as the video content 118. Each scene of the plurality of scenes may include information for example, but is not limited to, an occasion of a scene, an activity of the scene, a duration of the scene, a pace or tempo of a scene, a genre of the scene, one or more characters (i.e. actors) included in the scene, an indication of non-verbal scene (i.e. without dialogues), a transition shown in the scene, a prominent character included in the scene, an introduction of the prominent character in the scene, a narration included in the scene, or an audio-insertable position (one of the set of positions or audio placeholder) included in the scene.

The video content 118 may be associated with the textual information 116. In an embodiment, the video content 118 may include a plurality of image frames associated with the plurality of scenes. Each scene may include, but is not limited to, audio content (like dialogues) and image frames associated with the audio content. For example, if the video content 118 is a television program, then the audio content may include a dialogue audio in the scene, and other audio components, such as audio description. In addition to the audio content, the video content 118 may also include other components, such as text (e.g., subtitles or closed caption text), overlay graphics, and/or animations associated with the video content 118. In an embodiment, the server 104 may be implemented as a storage device which may store the textual information 116 and the video content 118.

The electronic device 102 may be configured to determine a first plurality of features for the plurality of scenes indicated by the textual information 116. In an example, the first plurality of features for the plurality of scenes indicated by the textual information 116 (like script) may include, but is not limited to, at least one of an occasion of a scene, an activity of the scene, a duration of the scene, a non-verbal scene, a transition of the scene, a prominent character in the scene, an introduction of the prominent character in the scene, a narration in the scene, or an audio-insertable position in the scene. The determination of the first plurality of features is described, for example, in FIG. 3A.

The electronic device 102 may be further configured to determine a first set of positions in the textual information 116 based on the determined first plurality of features for the plurality of scenes. The first set of audio files may be inserted at the determined first set of positions which are related to a first set of scenes of the plurality of scenes. The first set of scenes may be a subset of the plurality of scenes which may be selected based on the determined first plurality of features for the insertion of the first set of audio files. The first set of positions may be determined in the first set of scenes in the textual information 116. In an example, the first set of positions may include, but is not limited to, at least one of a set of start positions and a set of end positions based on which the first set of audio files may be reproduced. The first set of audio files may include, but is not limited to, at least one of a background audio file, or a song audio file.

Figure 3A:
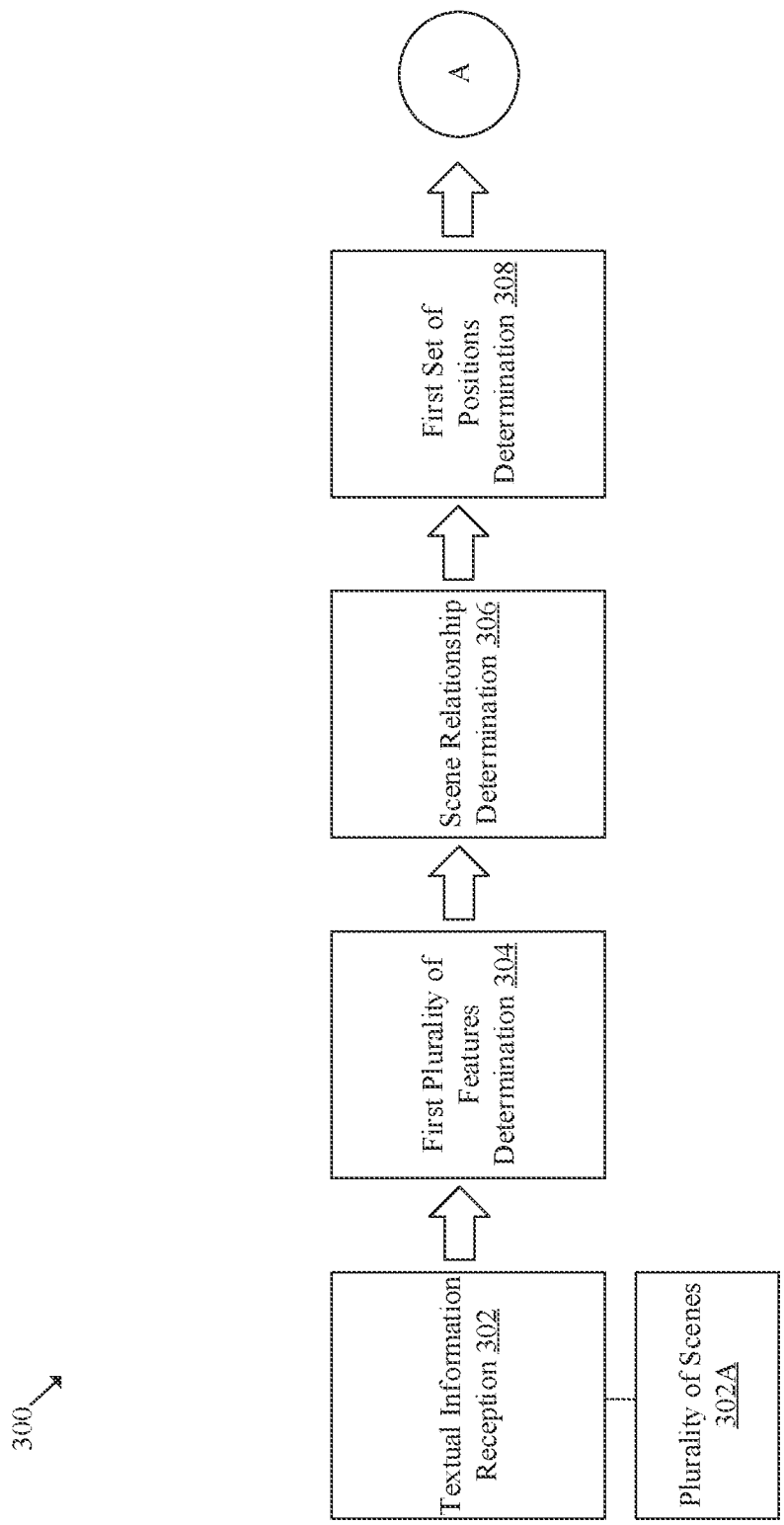
FIGS. 3A and 3B collectively depict a diagram that illustrates an exemplary processing pipeline for audio recommendation based on text information, in accordance with an embodiment of the disclosure.
Figure 3B:
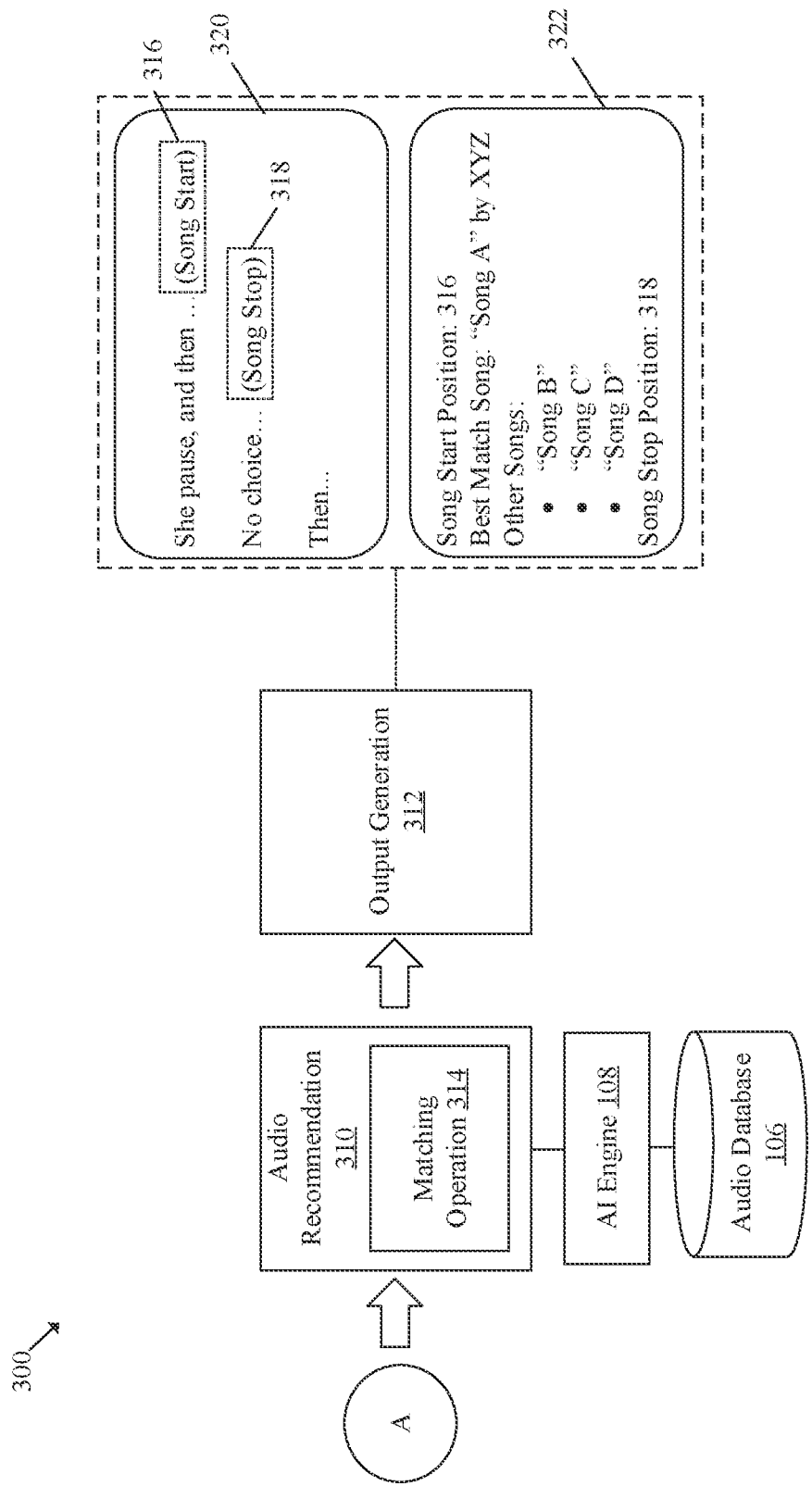

The details of the first set of positions is provided, for example, in FIGS. 3A and 3B.

The electronic device 102 may be further configured to automatically determine, by the artificial intelligent (AI) engine 108, the first set of audio files for the first set of scenes, based on a second plurality of features and the first plurality of features related to the first set of scenes. In an example, the second plurality of features related to the first set of scenes may include, but is not limited to, at least one of a pace or tempo of a scene, a genre of the scene, one or more characters in the scene, a dialogue audio in the scene, a location of the scene, a sentiment of the scene, a danceability of the scene, or a background ambience of the scene. The determination of the first set of audio files is described, for example in, FIGS. 3A and 3B. The electronic device 102 may be configured to control the display device 110 to display first information corresponding to the determined first set of positions and second information corresponding to the determined first set of audio files, as described, for example in, FIGS. 3A and 3B.

The disclosed electronic device 102 may automatically recommend the first set of positions within the textual information 116 at which the first set of audio files may be inserted. Based on the textual information 116, the disclosed electronic device 102 may further automatically recommend the suitable first set of audio files from the plurality of audio files stored in the audio database 106 that may be inserted at the recommended first set of positions. Such automatic recommendations of the first set of positions and the first set of audio files may reduce manual efforts and time required for audio determination and insertion in media content (like movies, a short video, video game content, or television shows, etc.) at various stages of production (such as, a pre-production, production, or post-production stage) of the media content.

In another embodiment, the disclosed electronic device 102 may determine one or more features from the plurality of frames associated with the plurality of scenes of the video content 118. The electronic device 102 may further determine a second set of positions and determine a second set of audio files (i.e. from the plurality of audio files stored in the audio database 106) to be inserted in the second set of positions of different scenes of the video content. The determination of the second set of positions and the second set of audio files (via the AI engine 108) is further described, for example, in FIGS. 4A and 4B. In another embodiment, the disclosed electronic device 102 may automatically generate lyrics information and related one or more audio files (like songs or background music) based on the features determined from the textual script information 116 and/or from the image frames of the video content 118. The automatic generation of the lyrics information and the related audio files is further described, for example, in FIG. 6.

Figure 2:
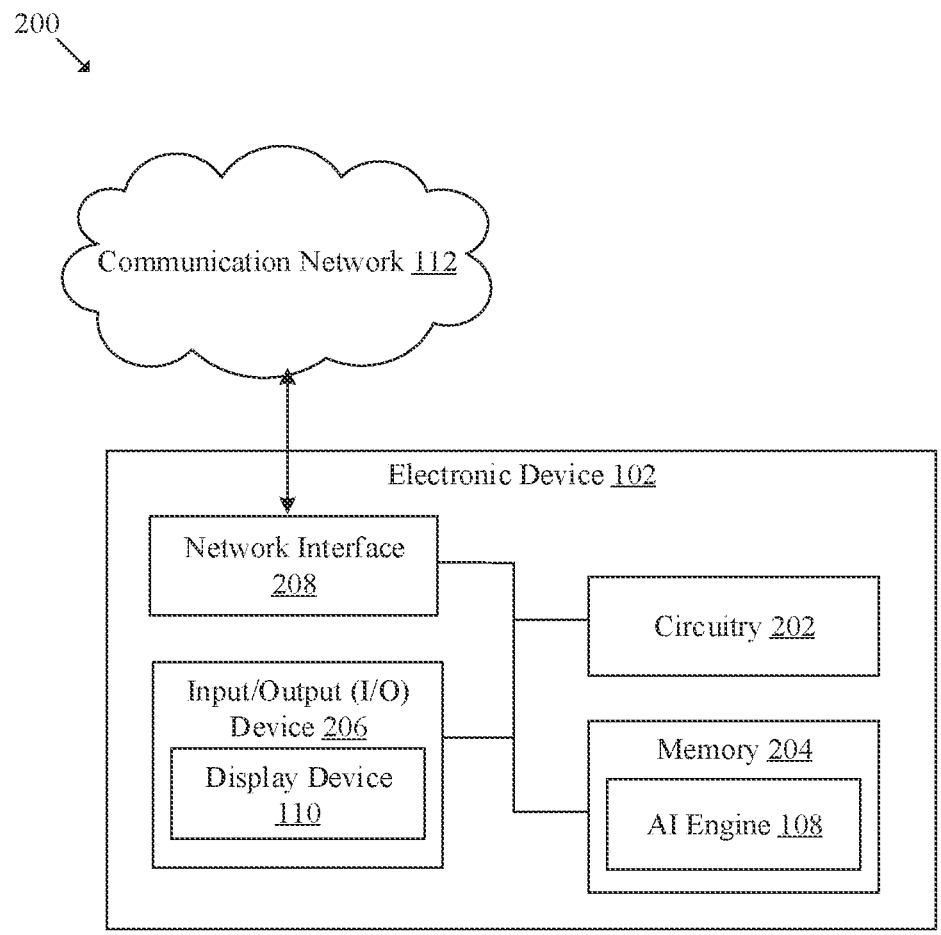
FIG. 2 is a block diagram that illustrates an exemplary electronic device of FIG. 1, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the electronic device 102. The electronic device 102 may include circuitry 202, a memory 204, an input/output (I/O) device 206, and a network interface 208. The I/O device 206 may include the display device 110. The network interface 208 may connect the electronic device 102 with the server 104 and the audio database 106, via the communication network 112.

The circuitry 202 may include suitable logic, circuitry, and/or interfaces that may be configured to execute program instructions associated with different operations to be executed by the electronic device 102. Different operations may include, but are not limited to, reception of the textual information 116 and/or the video content 118, determination of the first plurality of features and the second plurality of features from the textual information 116 and/or from the image frames of the video content 118, determination of the first set of positions and/or the second set of positions, determination of the first set of audio files and/or the second set of audio files, control of the display device 110, or generation of the lyrics information for at least one of the first set of audio files and/or the second set of audio files. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The memory 204 may be configured to store the AI engine 108. The memory 204 may store the textual information 116 and the video content 118 associated with textual information 116 (such as, but is not limited to, a script). The memory 204 may be further configured to store one or more of, but are not limited to, the set of positions, the set of audio files, the plurality of features for the plurality of scenes, or the generated lyrics information. In an embodiment, the memory 204 may store the plurality of audio files internally, rather than storage in the audio database 106. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. The I/O device 206 may include various input and output devices, which may be configured to communicate with the circuitry 202. In an example, the electronic device 102 may receive (via the I/O device 206) the user input indicative of the first set of positions in the textual information 116. In another example, the electronic device 102 may receive (via the I/O device 206) the user input indicative of a selection of the first set of scenes of the plurality of scenes for which the first set of audio files may be inserted. In an example, the electronic device 102 may display (via the display device 110 associated with the I/O device 206) the first information corresponding to the first set of positions and the second information corresponding to the first set of audio files. Examples of the I/O device 206 may include, but are not limited to, a touch screen, a keyboard, a mouse, a joystick, a display device (for example, the display device 110), a microphone, or a speaker.

The network interface 208 may include suitable logic, circuitry, interfaces, and/or code that may be configured to facilitate communication between the electronic device 102, the server 104, and the audio database 106, via the communication network 112. The network interface 208 may be implemented by use of various known technologies to support wired or wireless communication of the electronic device 102 with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). Various operations of the circuitry 202 for audio recommendation based on script information and video content are described further, for example, in FIGS. 3A, 3B 4A, 4B, 5, and 6.

FIGS. 3A and 3B collectively depict a diagram that illustrates an exemplary processing pipeline for audio recommendation based on text information, in accordance with an embodiment of the disclosure. FIGS. 3A and 3B are described in conjunction with elements from FIGS. 1 and 2. With reference to FIGS. 3A and 3B, there is shown a processing pipeline 300. The processing pipeline 300 may include operations from 302 to 312 to depict audio recommendation based on text information. The circuitry 202 or the electronic device 102 may execute the operations from 302 to 312.

At 302, textual information (for example, the textual information 116) may be received. In an embodiment, the circuitry 202 may be configured to receive the textual information 116. The textual information 116 may include, but is not limited to, a stored text portion corresponding to a script or a screenplay for video content (like the video content 118) which may be already produced (or to be produced) by a movie or a television show/program creator (such as a person like a movie producer or director; or a team like a movie or television program production company). In another embodiment, the textual information 116 may correspond to, but is not limited to, textual feeds, textual dialogues, or a textual narration, related to the video content. In an embodiment, the circuitry 202 may control the I/O device 206 to receive the textual information 116 based on a user input received from the first user 114. In such case, the user input may indicate a file or a document including the textual information 116 or indicate a path of a folder including such file or document. Additionally, or alternatively, the textual information 116 may be received from a data source. The data source may include, for example, a memory (such as the memory 204) on the electronic device 102, a cloud server (such as the server 104), or a combination thereof. The circuitry 202 may receive the user input related to the textual information 116 from the first user 114 and accordingly retrieve the textual information 116 from the data source based on the received user input. In such case, the user input may include, but is not limited to, a name of the movie or television program/show, or a unique identifier related to the movie or television program/show. The textual information 116 may indicate a plurality of scenes 302A for the video content 118 which may be already produced or to be produced. For example, the textual information 116 may include the text portion indicative of each scene of the plurality of scenes 302A for the video content 118. The text portion may include, but is not limited to, a dialogue, a narration, a subtitle, or a closed caption for a particular scene or a shot of the video content 118. In another embodiment, the textual information 116 may not be related to the video content 118, but may be related to an audiobook, where one or more audio files may be recommended by the disclosed electronic device 102 for different textual portions of the audiobook.

In an embodiment, the circuitry 202 may be configured to convert the received textual information 116 into raw text using natural language processing (NLP) techniques. The raw text may be a word, or a phrase extracted from the textual information 116 to determine at least one of a context of a scene or objects present in each scene for the plurality of scenes 302A indicated by the textual information 116. For example, the electronic device 102 may receive the textual information 116 and employ the NLP techniques to extract a first plurality of features from each scene indicated by the received textual information 116. In such case, the electronic device 102 may analyze the received textual information 116 and divide the textual information 116 into the plurality of scenes 302A, to further employ NLP techniques on each scene. Examples of the NLP techniques associated with analysis of the textual information 116 may include, but are not limited to, an automatic summarization, a sentiment analysis, a context extraction, a parts-of-speech tagging, a semantic relationship extraction, a stemming, a text mining, and a machine translation technique. The detailed implementation of the aforementioned NLP techniques may be known to one skilled in the art, and therefore, a detailed description for the aforementioned NLP techniques has been omitted from the disclosure for the sake of brevity.

At 304, a first plurality of features may be determined. In an embodiment, the circuitry 202 may be configured to determine the first plurality of features for the plurality of scenes 302A indicated by the textual information 116. The circuitry 202 may be configured to use the NLP techniques to determine the first plurality of features for the plurality of scenes 302A. The first plurality of features for the plurality of scenes 302A (i.e. indicated by the textual information 116) may indicate the context of the scene. The first plurality of features for the plurality of scenes 302A indicated by the textual information 116 may include, but is not limited to, an occasion of a scene, an activity of the scene, a duration of the scene, a non-verbal scene (with no dialogues), a transition of the scene, a prominent character included in the scene, profile information of the character in the scene, an introduction of the prominent character in the scene, a narration in the scene, or an audio-insertable position in the scene. The occasion of a scene may be related to a situation indicated in the scene. For example, the occasion of the scene may include, but is not limited to, a proposal scene, a wedding scene, a break-up scene, a divorce scene, a victory scene, a birth scene, a death scene, an educational scene, or an achievement scene. The activity of the scene may be related to an action indicated in the scene. For example, the action of the scene may include, but is not limited to, an adventure scene, a sport-related scene, a comedy scene, a romantic scene, a celebration scene, an action scene, a dance scene, an emotional scene, a fight scene, a health-related scene, a meeting-related scene.

The duration of the scene may be related to a time period (in seconds or minutes) corresponding to the scene. Examples of the duration of the scene may be, but are not limited to, 10 seconds, 30 seconds, 1 minute, or 5 minutes. The non-verbal scene may be related to a scene that may not include any dialogues in the scene. For example, the non-verbal scene may include, but is not limited to, a long scene where dialogues are not present, or an establishing scene. The transition of the scene may be related to a change from a previous scene to a current scene in order to establish a connection between the scenes. For example, the transition of the scene may include, but is not limited to, a scene cut or transition between the previous scene and the current scene. Based on the NLP techniques, the electronic device 102 may search for the scenes in the plurality of scenes 302A which may be used for the transitioning to connect a storyline of the textual information 116 related to the video content 118. The prominent character in the scene may be related to one or more characters in the scene. For example, the prominent characters (i.e. actor or actress) may include, but is not limited to, a male character or a female character (such as, a male or female lead character) around which a script revolves, or any other important character (e.g., a supporting character) in the script. The profile information of the character (or actor) may indicate a personality type of the character or whether the character in the scene is a big or lead actor or not. The profile information of different characters may be stored in the memory 204 or may act as a training dataset of the AI engine 108. If the profile information indicates that the present character in the scene is prominent or important as per the script, then the corresponding scene may be a potential scene to insert an audio file matching with the profile information and/or with the script for the character present in the scene. The introduction of the prominent character in the scene may be related to unveiling of the prominent character in the scene. For example, the introduction of the prominent character may include, but is not limited to, an introductory scene of the prominent character in a particular scene.

The narration in the scene may be related to a description associated with scene that may be provided by a person (like narrator) other than the one or more characters in the scene. In other words, the narration may be a third person narrative description in the scene. For example, the narration in the scene may include, but is not limited to, a passive dialog narrated by the third person. The audio-insertable position in the scene may be related to positions where audio files may be inserted. For example, the audio-insertable position in the scene may include, but is not limited to, a start position and a stop position indicted in the textual information 116 in order to insert the audio files. In an embodiment, the audio-insertable position in the scene may be pre-determined based on a user-input from a user (such as, a content creator or a script writer). The script writer or the content creator may select the scenes and define the audio-insertable positions (i.e. to insert audio files) in the selected scenes at the time of writing the textual information 116 for the video content 118 which has to be captured.

In an embodiment, the scenes in the plurality of scenes 302A which may include one or more features of the first plurality of features may be potential scenes (i.e. good candidate scenes) to insert or place the audio files (i.e. songs or background music file). The circuitry 202 may determine the first set of positions (like audio file placeholders to insert the first set of audio files) for such potential scenes determined from the plurality of scenes 302A based on the determined first plurality of features. For example, the scenes (i.e., out of the plurality of scenes 302A) with a particular occasion or with a particular activity may be selected to insert the audio file. In another example, a long duration scene with no dialogues (i.e. non-verbal scene), a scene with introduction of the prominent characters, a scene with appropriate transitions, a scene with the narration, or a scene with the audio-insertable position, may be selected as the potential scenes (or good candidate scenes) to determine the first set of positions (like audio placeholder) for the insertion of recommended audio files in the selected scenes or shots. The determination of the first set of positions is further described, for example, at 308 in FIG. 3A.

At 306, a relationship between scenes may be determined. In an embodiment, the circuitry 202 may be configured to determine a relationship of each scene of the plurality of scenes 302A with at least one of a previous scene or a next scene of the current scene. The relationship of each scene of the plurality of scenes 302A with at least one of the previous scene or the next scene of the scene may be related to (or indicate) a connection between a particular scene with at least one of the previous scene or the next scene of the particular scene. In an embodiment, the circuitry 202 may use a supervised machine learning technique and/or a Bi-directional Encoder Representations from Transformers (BERT)-based technique to determine the relationship of each scene with at least one of a previous scene or a next scene of the scene. In an example, a first scene may be a scene associated with a face-to-face conversation between two characters, and a second scene may be a hug scene between the two characters. In such a scenario, the circuitry 202 may determine a relationship between the first scene and the second scene as related scenes. In another example, the first scene may include a face-to-face conversation between two characters, and the second scene may be a scene of a new location with different characters. In such a scenario, the circuitry 202 may determine a relationship between the first scene and the second scene as unrelated scenes. Based on the determination of the relationship of each scene with at least one previous scene or next scene of the scene, the circuitry 202 may determine a rating for each scene. The rating may be indicative of whether the particular scene is the potential scene and may require an insertion of an audio or song to enhance the appeal of the scene to the audience. In an embodiment, a supervised learning technique may be used to determine the rating for each scene. For example, a rating on a scale of 1 (that may be lowest on the scale) to 5 (that may be highest on the scale) may be determined for a certain scene based on whether the scene is related to its previous or next scene. In an example, if the particular scene is related strongly with the previous or next scene of the particular scene, a rating of 4 or 5 may be determined for the particular scene. The rating of 4 or 5 may indicate that the particular scene may be a strong candidate scene for an insertion of an audio file (i.e., background audio file or song audio file).

At 308, the first set of positions may be determined. In an embodiment, the circuitry 202 may be configured to determine the first set of positions in the textual information 116 based on the determined first plurality of features for the plurality of scenes 302A. The first set of positions may be in a first set of scenes (i.e. potential or best candidate scenes)

that may be selected based on the analysis of the first plurality of features determined from the plurality of scenes 302A as described, for example, at 304 in FIG. 3A. The disclosed electronic device 102 may need to place the audio files (i.e. recommended based on features of the scene) at the determined first set of positions. In an embodiment, the circuitry 202 may be configured to receive a user input indicative of the first set of positions for different scenes in the textual information 116. The user input may be received from the first user 114 (i.e. a director, a producer, or a script writer). The first set of positions or the scenes indicated by the user input may be the potential scenes where audio files have to be recommended or placed, as per a decision of the first user 114 for the textual information 116 related to the video content 118. The circuitry 202 may be configured to determine the first set of positions for the first set of scenes in the textual information 116 based on the received user input. In another embodiment, the circuitry 202 may be configured to automatically determine the first set of positions in the first set of scenes based on the analysis of the first plurality of features as described, for example, at 304 in FIG. 3A. The first set of positions may correspond to a set of positions in the textual information 116 where the first set of audio files may be inserted or placed. The first set of positions may include, but is not limited to, a set of start positions and a set of end positions based on which the first set of audio files may be reproduced during the reproduction or playback of the video content 118. The set of start positions may relate to positions in the first set of scenes of the textual information 116 at which a reproduction of an audio file may begin, and the set of end position may relate to positions in the first set of scenes of the textual information 116 where the reproduction of the corresponding audio file may end.

In an embodiment, the first set of audio files may be inserted at the determined first set of positions which are related to the first set of scenes selected from the plurality of scenes 302A. The first set of audio files may include, but is not limited to, a background audio file, or a song audio file. The background audio file may relate to a background music inserted at one or more of the first set of scenes indicated by the textual information 116. The song audio file may include words such as lyrics and/or music.

In an embodiment, the circuitry 202 may be configured to receive user input (via the I/O device 206) indicative of a selection of at least one of the first set of scenes (i.e. out of the plurality of scenes 302A) for which the first set of audio files may be inserted. Based on the received user input, the circuitry 202 may be further configured to determine, by the artificial intelligent (AI) engine 108, the first set of audio files for the first set of scenes, as further described, for example, at 310 in FIG. 3B. In another embodiment, the circuitry 202 may be configured to automatically determine the first set scenes based on the determined first plurality of features for the plurality of scenes 302A as described, for example, at 304 in FIG. 3A. In an embodiment, the circuitry 202 may be further configured to determine at least one of the first set of scenes, to insert an audio file, based on the determined relationship of each scene of the plurality of scenes with at least one of a previous scene or a next scene of the scene. If there is the relationship determined between the first scene and the second scene with a higher rating value, the circuitry 202 may determine the first scene and/or the second scene as one of the first set of scenes to insert the audio file. In such case, the circuitry 202 may determine the first set of scenes for insertion of the audio files, based on the relationship ratings determined for each of the plurality of scenes 302A (as described, for example, at 306 in FIG. 3A).

At 310, the first set of audio files may be recommended. In an embodiment, the circuitry 202 may be configured to determine, by the AI engine 108, the first set of audio files for the selected first set of scenes, based on a second plurality of features and the first plurality of features related to the first set of scenes. The second plurality of features may be determined based on the analysis of the selected first set of scenes using the NLP techniques applied to the first set of scenes indicated in the textual information 116. The second plurality of features related to the first set of scenes may include, but is not limited to, a pace or tempo of a scene, a genre of the scene, one or more characters/actors involved in the scene, a relationship between the characters/actors in the scene, a gender of the characters/actors, an age of the characters/actors, a dialogue in the scene, a sentiment of the scene, an emotion/valence of the scene, a danceability of the scene, or a background ambience of the scene. The pace or tempo of a scene may be related to a speed of the scene. For example, the pace or tempo may be slow in a romantic scene and fast in a fight or action scene. The genre of the scene may include, but is not limited to, an action genre, a romantic genre, a love genre, a sad genre, a comedy genre, a chase genre, an emotional genre, a tragedy genre, or an anger genre. The sentiment of the scene may include, but is not limited to a positive sentiment, a negative sentiment, or a neutral sentiment. The danceability of the scene may include information indicative of whether the scene is danceable or not. In other words, a high danceability of the scene may indicate that a dance sequence or a song associated with a dance may be recommended for the scene. The background ambience of the scene may be related to an environment associated with the scene. For example, the background ambience of the scene may include, but is not limited to, an ambience environment in the scene, or a location in the scene. A relationship may indicate whether multiple actors or characters in the scene are related to each other or not. The relationship may be, but is not limited to, a couple, family friends, enemies, colleagues, siblings, rivals, parents, kids, or cousins.

In an embodiment, to determine the first set of audio files from the audio database 106, the circuitry 202 may be configured to control the AI engine 108 to compare one or more features from the first plurality of features and/or the second plurality of features with a third plurality of features associated with the plurality of audio files stored in the audio database 106. The third plurality of features may include, but is not limited to, lyrics information, emotions, a sentiment, a danceability, a language, a popularity, acoustics, a loudness, a speechiness, an occasion, a liveness, activity, a genre (i.e., music style), instrument information, a tempo, a singer name, a music composer name, or genders of one or more singers of the plurality of audio files. The lyrics information of the plurality of audio files may be related to lyrics of an audio file. The instrument information of the plurality of audio files may be related to types of instruments played in the first set of audio files. For example, the instrument information includes instruments, such as, but are not limited to, a piano, an acoustic guitar, an electric guitar, a bass guitar, a harp, a cello, a violin, an accordion, drums, a tambourine, a xylophone, a trumpet, a saxophone, or a flute. The tempo of the plurality of audio files may be related to a number of beats per minute (bpm) in the audio file. For example, the tempo may be one of, but is not limited to, very slow beats (such as 25-45 bpm), slow beats (such as 45-60 bpm), medium beats (such as 83-85 bpm), or fast beats (such as 92-112 bpm). The singer's name for the plurality of audio files may be a name of the vocalists or a background/playback singer of the audio file. The music composer of the plurality of audio files name may be a name of a maker of the corresponding audio file. The genders of the singers of the plurality of audio files may be one of, but are not limited to, a male, a female, a duet (including both a male singer and a female singer, a male singer who may sing for both male and female protagonists of the song, or a female singer who may sing for both male and female protagonists of the song), or a chorus/choir. The emotions of the plurality of audio files may indicate the emotions demonstrated by the corresponding audio file, like (but are not limited to) a happy emotion, a sad emotion, a neural emotion, a fear emotion, an excited emotion, a stressed emotion, an excitement emotion, or a scared emotion. Examples of the occasion and the activity of the plurality of audio files may be similar to the occasion and the activity indicated by the first plurality of features as described, for example, at 304 in FIG. 3A.

The circuitry 202 may be configured to determine the first set of audio files from the plurality of audio files stored in the audio database 106 based on the comparison. In an embodiment, the AI engine 108 may determine the first set of audio files from the plurality of audio files stored in the audio database 106, using a matching operation 314. The matching operation 314 may include a comparison of the one or more features from the first plurality of features and the second plurality of features with the third plurality of features of the plurality of audio files stored in the audio database 106 to determine the first set of audio files from the plurality of audio files. Each of the plurality of audio files stored in the audio database 106 may be tagged (or indexed) with one or more features of the third plurality of features. In such case, the third plurality of features may act as metadata associated with each of the plurality of audio files stored in the audio database 106. To perform the matching operation 314, the circuitry 202 or the AI engine 108 may extract the metadata (or the third plurality of features) of each of the plurality of audio files in the audio database 106 and further compare the extracted metadata of each of the plurality of audio files with one or more features of the first plurality of features and/or the second plurality of features determined for the first set of scenes (i.e. selected for the audio insertion). The disclosed electronic device 102 (using the AI engine 108) may perform the matching operation 314 to determine the first set of audio files (i.e. in the audio database 106) for which the third plurality of features may have a best match with most of the features (i.e. first plurality of features and/or the second plurality of features) related to the first set of scenes (i.e. potential scenes for audio insertion). If the one or more features from the first plurality of features and/or the second plurality of features (i.e. related to the first set of scenes) match with the third plurality of features of a set of audio files from the plurality of audio files stored in the audio database 106, then the set of audio files may be determined as the first set of audio files recommended for the first set of scenes and to be inserted at the first set of positions in the first set of scenes. For example, the circuitry 202 or the AI engine 108 may determine an audio file from the plurality of audio files which may have maximum or higher number of third plurality of features matching with higher number of features from the first plurality of features and/or the second plurality of features related to the selected scenes for audio insertion. For example, in case a particular scene of the first set of scenes may indicate a particular occasion/activity, may have a particular genre, may include a particular characters and a particular location or background ambience (as the first plurality of features and/or the second plurality of features), then the audio file in the audio database 106 with same occasion/activity, genre, character, location, and the background ambience (as the third plurality of features) may be selected or recommended by the AI engine 108. The selected audio may be a best match with the features of one of the first set of scenes selected for the audio insertion. The determined first set of audio files recommended for the first set of scenes indicated by the textual information 116, may complement the first set of scenes such that it may enhance an appeal of the first set of scenes to an audience of the video content 118 related to the textual information 116. In an embodiment, the AI engine 108 may be trained on the first plurality of features, the second plurality of features of the plurality of scenes 302A, and third plurality of features of the plurality of audio files in the audio database 106, to automatically recommended the best matching audio files using the matching operation 314. In such case, different examples or variations of the first plurality of features, the second plurality of features, and the third plurality of features may be a training dataset of the trained AI engine 108.

In another embodiment, the audio file in the audio database 106, which may have lower number of third plurality of features matching with the features extracted for each of the first set of scenes, may be recommended by the AI engine 108 as a candidate audio file for insertion. The circuitry 202 may control the display device 110 to display such candidate audio files recommended for insertion in the first set of scenes at the first set of positions. In an embodiment, the circuitry 202 may receive the user input from the first user 114 to select or reject the recommended audio files (or candidate audio files) before the insertion of the recommended audio files at the first set of positions. Such user input may be a confirmation whether the first user 114 (like a director, a producer, or script writer) really wants to insert the recommended audio file (or candidate audio files) at determined position of a particular scene in the textual information 116 or not.

In an embodiment, the circuitry 202 may be configured to determine scene analysis quotient information for each scene of the first set of scenes based on the determined first plurality of features for the plurality of scenes 302A or only for the first set of scenes selected for audio insertion from the plurality of scenes 302A. The scene analysis quotient information may be related to an assessment of each scene of the first set of scenes based on the first plurality of features. For example, the scene analysis quotient information may include, but is not limited to, an ambience in a scene, a location in the scene, an occasion of the scene, an activity in the scene, an emotion in the scene, one or more characters in the scene, a relationship between the one or more characters in the scene. The ambience in a scene may be related to an environment indicative in the scene. For example, the ambience in the scene may include, but is not limited to a happy environment, a joyful environment, an amused environment, a euphoric environment, a romantic environment, a powerful environment, a relaxed environment, a sunset environment, or a sunrise environment. The location in the scene may be related to a site or locality associated with the scene. For example, the location in the scene, may include, but is not limited to, an enclosed site (such as, a room, an office, a hotel, a restaurant, a concert, a theater, a mall, a pub, a bar, or a warehouse), a vehicle (such as, a car, a bus, a train, an aircraft, or a ship), or an outdoor site (such as, a sea, a beach, a snow area, mountains, a forest, a farm, a city, or a village). The emotion in the scene may be a mood indicated in the scene. For example, the emotion in the scene may include, but is not limited to, a happy, a sad, a fear, an anger, an indignation, a disgust, a surprise, a trust, an anticipation, an expectation, an enjoyment, a friendship, an envy, a love, a sadness, or a suffering. The one or more characters in the scene may include male or female characters present in the scene. The relationship between the one or more characters in the scene may be a connection or an association between the one or more characters in the scene. For example, the relationship between the one or more characters may include, but is not limited to, friends, a couple, a family, children, parent, sibling, or unrelated (crowd).

In an embodiment, the circuitry 202 may be configured to use a sentiment analysis technique to determine a sentiment or context associated with each scene of the first set of scenes. The circuitry 202 may further identify words or phrases in each scene of the first set of scenes based on one or more NLP techniques. The circuitry 202 may identify a set of features associated with each scene of the first set of scenes based on the determined sentiment or context and the identified words or phrases in each scene of the first set of scenes. Examples of the set of features associated with each scene of the first set of scenes may include, but are not limited to, an ambience in the scene, a location in the scene, an occasion of the scene, an activity in the scene, an emotion in the scene, one or more characters in the scene, a relationship between the one or more characters in the scene. The scene analysis quotient information may be determined based on a combination of the identified set of features.

The circuitry 202 may be further configured to determine a genre of the audio file to be inserted for each scene of the first set of scenes based on the scene analysis quotient information which may be determined for each scene of the first set of scenes. In an embodiment, the determined genre may be used by the artificial intelligent (AI) engine 108 (for example, a deep learning model) to identify the audio file in the audio database 106 with same genre. For example, the matching operation 314 of the AI engine 108 may compare the genre determined based on the identified set of features (i.e. scene analysis quotient information associated with each scene) with the genre of the plurality of audio files in the audio database 106 to determine one of the first set of audio files with same genre. In other words, the circuitry 202 may be configured to determine, by the AI engine 108, at least one of the first set of audio files for the first set of scenes based on the genre which may be further determined based on the scene analysis quotient information. For example, the plurality of audio files in the audio database 106 be tagged based on features (e.g., genre) of each audio file. The AI engine 108 may determine at least one of the first set of audio files with a genre similar to the genre determined based on the identified set of features (i.e., scene analysis quotient information). The genre of the audio file to be inserted for at least one scene of the first set of scenes may include, but is not limited to, a rock genre, a blues genre, a country genre, a Caribbean genre, a folk genre, a pop genre, a jazz genre, a classical genre, a hip hop genre, an electronic genre, a Latin genre, an oriental genre, a rhythm & blues genre, a soul genre, an Asian genre, or African genre. In an embodiment, the circuitry 202 may be configured to use a genre mapping technique to determine the genre of the audio file. The genre mapping method may include a set of computational techniques, by which the genre of the audio file may be mapped with the scene analysis quotient information. The genre mapping method or the feature mapping method may be, for example, a template mapping method, a machine learning, or deep learning-based feature mapping. Detailed implementation of these methods may be known to one skilled in the art, and therefore, a detailed description of such methods has been omitted from the disclosure for the sake of brevity.

In an embodiment, the circuitry 202 may be configured to determine user profile information associated with a first user (e.g., the first user 114). The user profile information of the first user 114 (like the director, script writer, or producer of the video content 118) may be stored in the memory 204 or the server 104 The circuitry 202 may be configured to retrieve the user profile information associated with the first user 114 from the memory 204 or the server 104. Based on the determined or retrieved user profile information, the circuitry 202 may be configured to determine, by the AI engine 108, at least one of the first set of audio files for the first set of scenes. The user profile information may indicate, but is not limited to, preferences of the first user 114 to insert an audio file of the first set of audio files, a genre of a scene to insert the audio file, or historical data related to the audio file. The preferences of the first user 114 to insert the audio file of the first set of audio files may be related to user preferences associated with a selection of the first set of audio files. The selection of the audio file may be based on, but is not limited to, a singer, a music composer of the audio file, or musical instruments used in the audio file. The genre of a scene to insert the audio file may be related to the user preferences associated with the genre of the scene or associated with the audio file for insertion in a particular scene. For example, the first user 114 may insert the audio file for a particular genre. Different examples of the genre are aforementioned, for example, at 310 in FIG. 3B. The historical data related to the audio file may be associated with the selection of the audio files in the past by the first user 114. For example, the circuitry 202 may be configured to store the user profile information in the memory 204 of the electronic device 102. The user profile information may be stored in a form of a look up table, in a manner, that the preferences of the first user 114 to insert the audio file of the first set of audio files, or the genre of the scene to insert the audio file may be correlated based on the historical data related to the audio file. Therefore, the disclosed electronic device 102 may also consider the user profile information (i.e. indicating preferred audio file, or preferred genre, or selected audio file in past) of the first user 114, to further determine the first set of audio files for insertion at the first set of positions related to the first set of scenes indicated by the textual information 116 (for example textual script).

At 312, output may be generated. In an embodiment, the circuitry 202 may be configured to control the display device 110 to display first information corresponding to the determined first set of positions and second information corresponding to the determined first set of audio files. In FIG. 3B, as an example, there is shown first information 320 corresponding to the determined first set of positions in the textual information 116. The first information 320 may include a text (i.e. a portion of the textual script) that may indicate a scene displayed on the display device 110, and the determined first set of positions in the displayed text, such as "She pause, and then . . . song start (or a start position 316). No choice . . . song stop (or an end position 318). then . . . ". In an embodiment, the background audio file may be inserted between the start position 316 and the end position 318. In case of insertion of the song audio file, only the start position 316 (i.e. without end position 318) may correspond to the recommended song audio file as dialogue of the scene may not be reproduced while the playback of the song audio file during the playback of the video content 118 (either produced or to be produced based on the textual information 116).

There is further shown in FIG. 3B, second information 322 corresponding to the determined first set of audio files for the displayed text indicating the scene. The second information 322 may include a recommended best match audio file for the start position 316 and/or the end position 318, such as "Song A" by XYZ, and a list of other recommended audio files, like Song B, Song C, and Song D. The list of other recommended audio files may be the candidate audio files as described, for example, at 310 in FIG. 3B. The circuitry 202 may receive the user inputs from the first user 114 to finally select or reject the recommended best matching audio file or the recommended candidate audio files to be inserted at the determined positions of the particular scene indicated by the textual information 116 of the video content 118 (like a movie, a short video, or a television show). In an embodiment, the circuitry 202 may further control (or update) the audio database 106 to categorize or tag the stored plurality of audio files based on the selection or rejection preferences of the first user 114. This may further enhance the quality of recommendation of audio files from the audio database 106, due to the consideration of the audio files which were selected in past or the rejection of the audio files which were not preferred by the first user 114 in past.

In an embodiment, the circuitry 202 may control the AI engine 108 to generate recommendations associated with use of the determined first set of audio files. For example, the recommendations may include, but is not limited to, use of an original version of the audio file, use of a remixed version of the audio file, use of a version of the audio file sung by singer 'A' or use of a newly generated audio file (for example, an audio file generated by the AI engine 108). Therefore, as described at 302 to 312 in FIGS. 3A and 3B, the disclosed electronic device 102 may analyze (say during pre-production of the video content 118) the features of different scenes indicated by the textual information 116 (like textual script, textual narration, or textual feeds), automatically determine the appropriate positions in the textual information 116, and automatically recommended best matching audio files (like songs or background music) to be inserted at the determined positions related to selected scenes of the textual information 116. Thus, significant amount of manual effort and time of the first user 114 may be saved to identify the appropriate positions and recommend appropriate audio files based on the manual analysis of the textual information 116.

It may be noted that one best matching audio file (i.e. song 'A') and three candidate audio files (song 'B', song 'C', and song 'D') recommended for one scene in the textual information 116 shown in FIG. 3B is presently merely as an example. The disclosed electronic device 102 may recommend N number of audio files for insertion in N number of selected scenes in the textual information 116, without a departure from the scope of the disclosure.

Figure 4A:
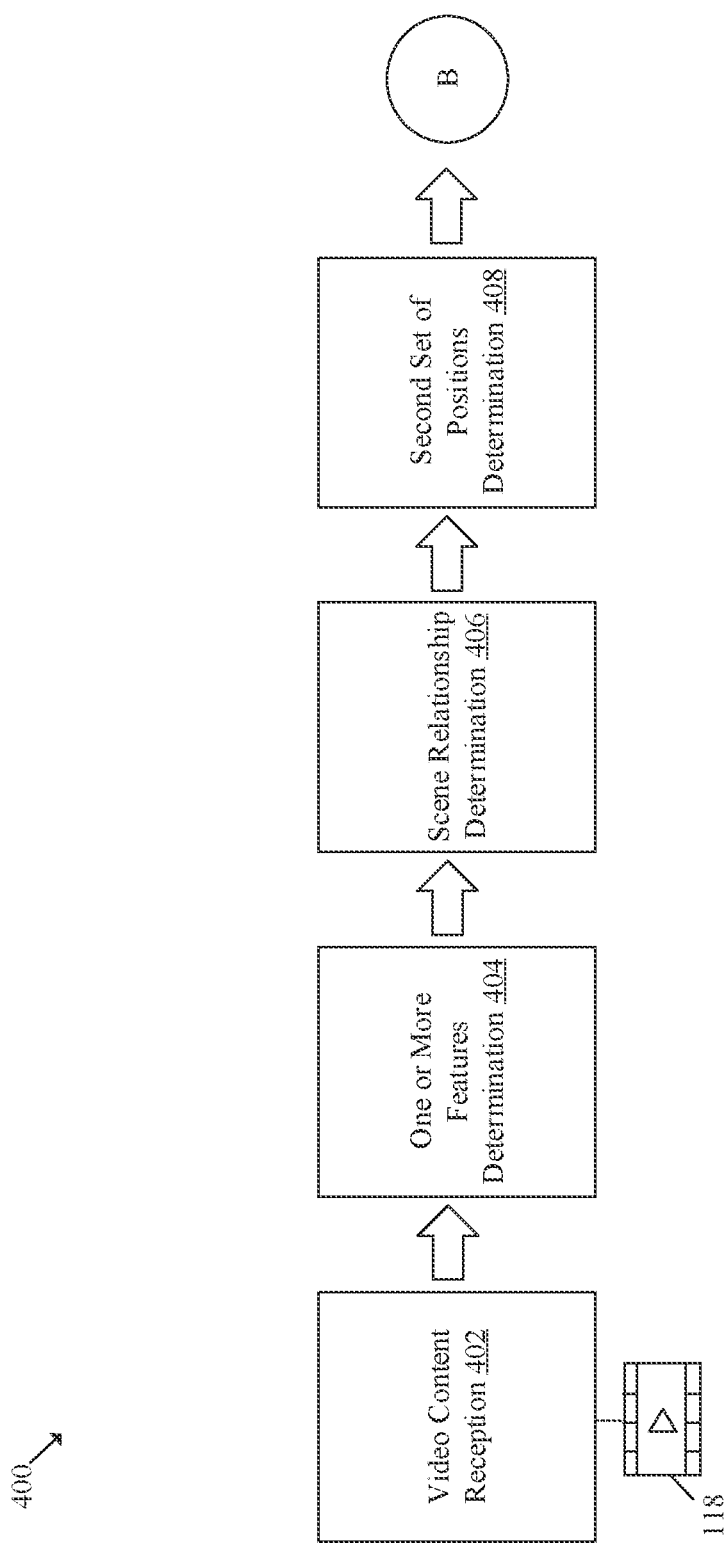
FIGS. 4A and 4B collectively depict a diagram that illustrates an exemplary processing pipeline for audio recommendation based on video content, in accordance with an embodiment of the disclosure.
Figure 4B:
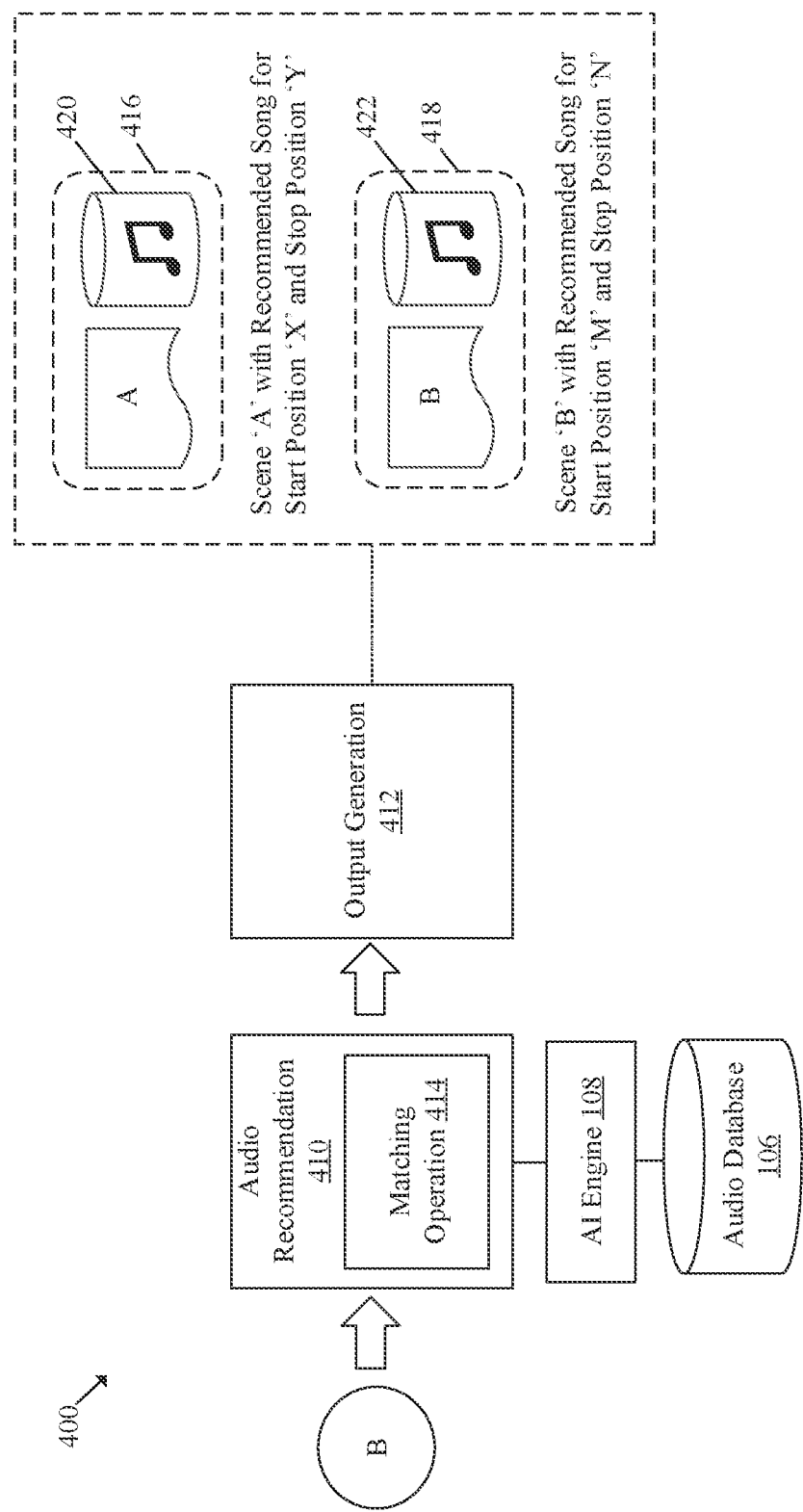

FIGS. 4A and 4B collectively depicts a diagram that illustrates an exemplary processing pipeline for audio recommendation based on video content, in accordance with an embodiment of the disclosure. FIGS. 4A and 4B are described in conjunction with elements from FIGS. 1, 2, 3A, and 3B. With reference FIGS. 4A and 4B, there is shown a processing pipeline 400. The processing pipeline 400 may include operations from 402 to 412 to depict audio recommendation based on video content. The circuitry 202 in FIG. 2 or the electronic device 102 in FIG. 1 may execute the operations from 402 to 412.

At 402, the video content 118 may be received. In an embodiment, the circuitry 202 may be configured receive the video content 118. The video content 118 may include, but is not limited to, a stored video file corresponding to a script or a screenplay. In one embodiment, the script or screenplay may correspond to the textual information 116. The video content 118 may include, but is not limited to, a movie, a video clip, video game content, or a television show/program, which may already be captured (or produced) during the production stage. In an embodiment, the circuitry 202 may control the I/O device 206 to receive the video content 118 based on a user input from the first user 114. In such case, the user input may indicate a file or a document including the video content 118 or indicate a path of a folder including such file or document. Additionally, or alternatively, the video content 118 may be received from a data source. The data source may include, for example, a memory (such as the memory 204) on the electronic device 102, a cloud server (such as the server 104), or a combination thereof. The circuitry 202 may receive the user input related to the video content 118 from the first user 114 and accordingly retrieve the video content 118 from the data source based on the received user input. In such case, the user input may include, but is not limited to, a name of the movie, a short video, or television program/show, or a unique identifier related to the movie or television program/show. The video content 118 may include a plurality of image frames associated with a plurality of scenes. For example, the video content 118 may include the plurality of image frames indicative of each scene of the plurality of scenes.

In an embodiment, the circuitry 202 may be configured to convert the received video content 118 into the plurality of scenes. Each scene of the plurality of scenes may include the plurality of image frames. The circuitry 202 may analyze each image frame in each scene of the plurality of scenes to determine at least one of a context of a scene or objects present in the scene for the plurality of scenes included in the video content 118. For example, the electronic device 102 may receive the video content 118 and employ segmentation techniques to extract the plurality of image frames associated with each of the plurality of scenes. The detailed implementation of the segmentation techniques may be known to one skilled in the art, and therefore, a detailed description for the segmentation techniques has been omitted from the disclosure for the sake of brevity. For example, the plurality of image frames may correspond to a plurality of BRoll shots associated with the plurality of scenes of the video content 118.

At 404, one or more features may be determined. In an embodiment, the circuitry 202 may be configured to determine the one or more features from the plurality of image frames associated with the plurality of scenes of the received video content 118. The determined one or more features may include, but are not limited to, the first plurality of features and the second plurality of features described, for example, in FIGS. 3A and 3B with respect to the textual information 116. In an embodiment, the circuitry 202 may analyze each of the plurality of image frames of each scene in the video content 118 and determine the first plurality of features for each scene. The first plurality of features determined from the plurality of image frames associated with the plurality of scenes of the received video content 118 may include, but is not limited to, an occasion of a scene, an activity of the scene, a duration of the scene, a non-verbal scene, a transition of the scene, a prominent character in the scene, an introduction of the prominent character in the scene, a narration in the scene, or an audio-insertable position in the scene. Similarly, the circuitry 202 may analyze each of the plurality of image frames of each scene in the video content 118 and determine the second plurality of features for each scene. The second plurality of features determined from the plurality of image frames associated with the plurality of scenes of the received video content 118 may include, but is not limited to, a pace or tempo of a scene, a genre of the scene, one or more characters in the scene, a dialogue audio in the scene, a relationship between the characters, a gender of the characters, an age of the characters, a location of the scene, a sentiment of the scene, a danceability of the scene, an emotion/valence of the scene, or a background ambience of the scene. The details of the first plurality of features and the second plurality of features are provided, for example in FIGS. 3A, and 3B. The circuitry 202 may apply, but is not limited to, different image processing techniques, object detection techniques, or face recognition techniques on the plurality of image frames of each scene of the video content to determine the first plurality of features and the second plurality of features from different scenes of the video content 118.

At 406, a relationship between scenes may be determined. In an embodiment, the circuitry 202 may be configured to determine a relationship of each scene of the plurality of scenes in the video content 118 with at least one of a previous scene or a next scene of the scene. Based on the determination of the relationship of each scene with at least one previous scene or next scene of the scene, the circuitry 202 may determine a rating for each scene. The rating may be indicative of whether the particular scene may require an insertion of an audio or song to enhance the appeal of the scene to the audience. The determination of the relationship of each scene of the plurality of scenes and the determination of the rating for each scene of the plurality of scenes is described, for example, in FIGS. 3A and 3B with respect to the textual information 116 related to the video content 118.

At 408, a second set of positions may be determined. In an embodiment, the circuitry 202 may be configured to determine the second set of positions (i.e. audio file placeholder) in the received video content 118 based on the one or more features determined from the first plurality of features and the second plurality of features for the plurality of scenes of the video content 118. As described, for example, at 304 and 308 in FIG. 3A (at least with respect to the textual information 116), the second set of positions may correspond to a second set of scenes from the plurality of scenes in the video content 118. The second set of scenes may be the potential scenes (i.e. good candidate scenes) determined based on the analysis of the first plurality of features (i.e. extracted from scenes of the video content 118) for the insertion of audio files (such as a second set of audio files) at the second set of positions. In an embodiment, the circuitry 202 may be configured to receive a user input indicative of the second set of positions in the video content 118. The user input may be received from the first user 114 (i.e. a director, a producer, or a script writer). The second set of positions or the second set of scenes indicated by the user input may be the potential scenes where audio files have to be recommended or placed, as per a decision of the first user 114 for the video content 118. The circuitry 202 may be configured to determine the second set of positions for the second set of scenes in the video content 118 based on the received user input. In an embodiment, the user input may be received from the first user 114 to manually select at least one of the second set of scenes to insert the recommended audio file. In another embodiment, the circuitry 202 may be configured to automatically determine the second set of positions in the second set of scenes of the video content 118 based on the analysis of the first plurality of features as described, for example, at 304 in FIG. 3A. The second set of positions may correspond to a set of positions in the video content 118 where the second set of audio files may be inserted. The second set of positions may include, but is not limited to, a set of start positions and a set of end positions based on which the second set of audio files may be reproduced.

In an embodiment, the second set of audio files may be inserted at the determined second set of positions which are related to the second set of scenes selected from the plurality of scenes of the video content 118. The second set of audio files may include, but is not limited to, a background audio file or a song audio file. In an embodiment, the circuitry 202 may be further configured to determine at least one of the second set of scenes, to insert an audio file, based on the determined relationship of each scene of the plurality of scenes with at least one of the previous scene or the next scene of the corresponding scene. If a relationship is determined between a first scene and a second scene (such as previous or next scene of the first scene), the circuitry 202 may determine the first scene or the second scene as one of the second set of scenes to insert the audio file. In another example, the circuitry 202 may determine the second set of scenes for insertion of the audio file based on the ratings determined for each of the second set of scenes (as described, for example, at 406 in FIG. 4A). The determination of the second set of positions is similar to the determination of the first set of positions. The determination of the first set of positions is described for example in FIGS. 3A and 3B.

At 410, the second set of audio files may be determined. In an embodiment, the circuitry 202 may be configured to determine, by the AI engine 108, the second set of audio files for the second set of scenes based on the determined one or more features. In an embodiment, the circuitry 202 may be configured to automatically determine, by the AI engine 108, the second set of audio files for the second set of scenes. In an embodiment, to determine the second set of audio files from the audio database 106, the circuitry 202 may be configured to control the AI engine 108 to compare the one or more features (i.e. out of the first plurality of features and/or the second plurality of features extracted from the plurality of image frames) with the third plurality of features of associated with the plurality of audio files stored in the audio database 106. The circuitry 202 may be configured to determine the second set of audio files from the plurality of audio files stored in the audio database 106 based on the comparison. The AI engine 108 may determine the second set of audio files from the plurality of audio files stored in the audio database 106, using a matching operation 414. The matching operation 414 may be similar to the matching operation 314 as described, for example, at 310 in FIG. 3B. The matching operation 414 may include a comparison of the one or more features with the third plurality of features of the plurality of audio files stored in the audio database 106 to determine the second set of audio files from the plurality of audio files as described, for example, at 310 in FIG. 3B. To perform the matching operation 414, the circuitry 202 or the AI engine 108 may extract the third plurality of features (or tagged metadata) of each of the plurality of audio files in the audio database 106 and further compare the extracted metadata of each of the plurality of audio files with the one or more features determined for the second set of scenes (i.e. selected for the audio insertion). The disclosed electronic device 102 (using the AI engine 108) may perform the matching operation 414 to determine the second set of audio files (i.e. in the audio database 106) for which the corresponding third plurality of features may have a best match with most of the features (i.e. first plurality of features and/or the second plurality of features) related to the second set of scenes (i.e. potential scenes for audio insertion) as described, for example, at 310 in FIG. 3B. For example, the circuitry 202 or the AI engine 108 may determine an audio file from the plurality of audio files which may have maximum or higher number of third plurality of features matching with higher number of features from the first plurality of features and/or the second plurality of features related to the selected second set of scenes for audio insertion. In another embodiment, the audio file in the audio database 106, which may have lower number of third plurality of features matching with the features extracted for each of the second set of scenes, may be recommended by the AI engine 108 as the candidate audio files for insertion. The circuitry 202 may control the display device 110 to display such candidate audio files recommended for insertion in the second set of scenes at the second set of positions. In an embodiment, the circuitry 202 may receive the user input from the first user 114 to select or reject the recommended audio files (or candidate audio files) before the insertion of the recommended audio files at the second set of positions of the video content 118. Such user input may be a confirmation whether the first user 114 (like a director, a producer, or script writer) really wants to insert the recommended audio file (or candidate audio file) at determined position of a particular scene in the video content 118 or not.

In an embodiment, the circuitry 202 may be further configured to use a sentiment analysis technique to determine a sentiment or context associated with each scene of the second set of scenes associated with the plurality of image frames extracted from the video content 118. The circuitry 202 may further identify words or phrases in each scene of the second set of scenes based on one or more NLP techniques. The circuitry 202 may identify a set of features associated with each scene of the second set of scenes based on the determined sentiment or context and the identified words or phrases in each scene of the second set of scenes. Examples of the set of features associated with each scene of the second set of scenes may include, but are not limited to, an ambience in the scene, a location in the scene, an occasion of the scene, an activity in the scene, an emotion in the scene, one or more characters in the scene, a relationship between the one or more characters in the scene. The circuitry 202 may further determine scene analysis quotient information associated with the video content 118 based on a combination of the identified set of features.

The circuitry 202 may be further configured to determine a genre of the audio file to be inserted for each scene of the second set of scenes based on the scene analysis quotient information which may be determined for each scene of the first set of scenes. In an embodiment, the determined genre of the audio file may be used by the artificial intelligent (AI) engine 108 (for example, a deep learning model) to identify the audio file in the audio database 106 with same genre. For example, the matching operation 414 of the AI engine 108 may compare the genre determined based on the identified set of features (i.e. scene analysis quotient information associated with each scene) with the genre of the plurality of audio files in the audio database 106 to determine one of the second set of audio files with same genre. In other words, the circuitry 202 may be configured to determine, by the AI engine 108, at least one of the second set of audio files for at least one the second set of scenes based on the genre which may be further determined based on the scene analysis quotient information as described, for example, at 310 in FIG. 3B. In an embodiment, the circuitry 202 may be configured to use the genre mapping technique to determine the genre of the audio file. The genre mapping method may include a set of computational techniques, by which the genre of the audio file may be mapped with the scene analysis quotient information. The genre mapping method or the feature mapping method may be, for example, a template mapping method, a machine learning, or deep learning-based feature mapping. Detailed implementation of these methods may be known to one skilled in the art, and therefore, a detailed description of such methods has been omitted from the disclosure for the sake of brevity. The determination of the second set of audio files is similar to the determination of the first set of audio files. The determination of the first set of audio files is described for example in FIGS. 3A, and 3B.

At 412, output may be generated. In an embodiment, the circuitry 202 may be configured to control the display device 110 to display first information corresponding to the determined second set of positions and second information corresponding to the determined second set of audio files. As an example, at 416 in FIG. 4B, there is shown the first information corresponding to the determined set of positions such as a start position 'X' and a stop position 'Y', and the second information corresponding to the determined audio file 420 (i.e. second set of audio files) such as a recommended song for scene 'A' in the video content 118, where the determined audio file 420 is to be inserted between the start position 'X' and the stop position 'Y'. For example, at 418 in FIG. 4B, there is shown the first information corresponding to the determined set of positions such as a start position 'M' and a stop position 'N', and the second information corresponding to the determined audio file 422 (i.e. second set of audio files) such as a recommended song for scene 'B' in the video content 118, where the determined audio file 422 is to be inserted between the start position 'M' and the stop position 'N'. In these example, both scenes 'A' and scene 'B' may be included in the second set of scenes which may be selected for audio insertion either based on analysis of the first plurality of features for the second set of scenes, or based on the user input received from the first user 114. In an embodiment, the circuitry 202 may control the display device 110 to display information about a set of candidate audio files recommended for different scenes of the second set of scenes. The circuitry 202 may receive the user inputs from the first user 114 to finally select or reject the recommended best match audio file or the recommended candidate audio files to be inserted at the determined positions of the particular scene of the video content 118 (like a movie). Therefore, as described at 402 to 412 in FIGS. 4A and 4B, the disclosed electronic device 102 may automatically analyze (say during production or post-production of the video content 118) the features of different scenes in the captured video content 118, automatically determine the appropriate positions in the video content 118, and automatically recommended best matching audio files (like songs or background music) to be inserted at the determined positions related to selected scenes of the video content 118. Thus, significant amount of manual effort and time of the first user 114 may be saved to identify the appropriate positions and recommend appropriate audio files based on the manual analysis of different scenes of the video content 118.

It may be noted that two recommended audio files (i.e. the audio file 420 and the audio file 422) for two scenes (i.e.

scene 'A' and scene 'B') shown in FIG. 4B is presently merely as an example. The disclosed electronic device 102 may recommend N number of audio files for insertion in N number of selected scenes of the video content 118, without a departure from the scope of the disclosure.

In an embodiment, the circuitry 202 may be further configured to automatically determine positions (i.e., audio placeholder) in the video content 118 and audio files for insertion at the determined positions, based on the analysis of both textual information 116 and the image frames of the video content 118 as respectively described, in FIGS. 3A-3B and 4A-4B. In such case, the circuitry 202 may be configured to receive both the video content 118 and with the textual information 116 based on which the video content 118 may be captured or produced. The circuitry 202 may be configured to receive the textual information 116 that may indicate a plurality of scenes 302A for the video content 118, and receive the image frames of the video content 118 associated with the textual information 116. The reception of the textual information 116 and the video content 118 is described, for example, at 302 in FIGS. 3A and 3B and at 402 in FIGS. 4A, and 4B. The audio recommendation based on the textual information 116 and the video content 118 is described further, for example, in FIG. 5.

Figure 5:
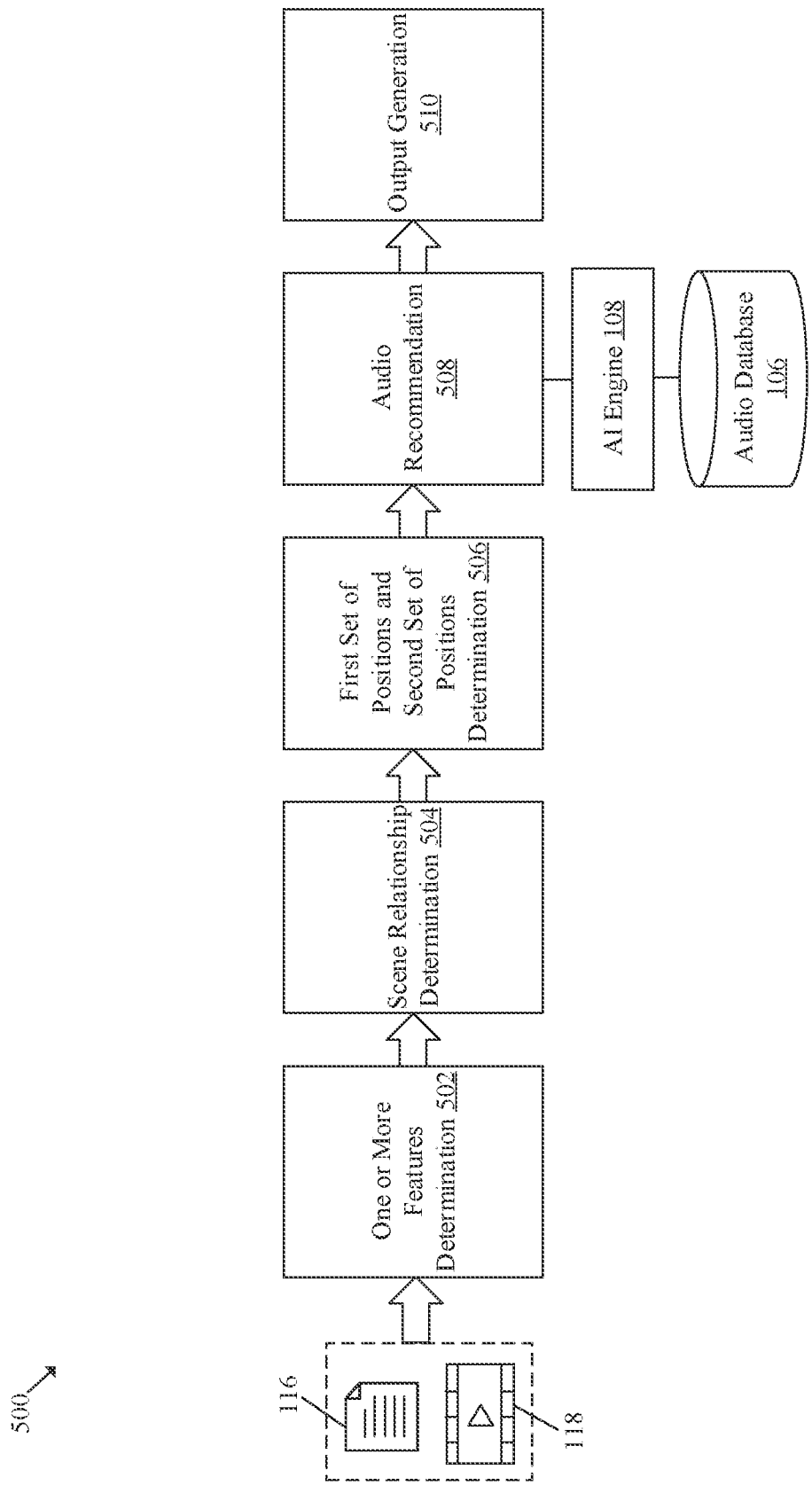
FIG. 5 is a diagram that illustrates an exemplary processing pipeline for audio recommendation based on text information and video content, in accordance with an embodiment of the disclosure.

FIG. 5 is a diagram that illustrates an exemplary processing pipeline for audio recommendation based on text information and video content, in accordance with an embodiment of the disclosure. FIG. 5 is described in conjunction with elements from FIGS. 1, 2, 3A, 3B, 4A, and 4B. With reference FIG. 5, there is shown a processing pipeline 500. The processing pipeline 500 may include operations from 502 to 510 to depict audio recommendation based on text information and video content. The circuitry 202 in FIG. 2 or the electronic device 102 in FIG. 1 may execute the operations from 502 to 510.

At 502, the one or more features may be determined. In an embodiment, the circuitry 202 may be configured to determine one or more features of the first plurality of features and the second plurality of features from the plurality of image frames associated with the plurality of scenes of the received video content 118 and from the plurality of scenes indicated by the textual information 116. The determined one or more features may include, but are not limited to, at least one of the first plurality of features and at least one of the second plurality of features. The first plurality of features extracted from the plurality of image frames associated with the plurality of scenes of the received video content 118 may include, but is not limited to, an occasion of a scene, an activity of the scene, a duration of the scene, a non-verbal scene, a transition of the scene, a prominent character in the scene, profile information of the character in the scene, an introduction of the prominent character in the scene, a narration in the scene, or an audio-insertable position in the scene. The second plurality of features extracted from the plurality of image frames associated of the received video content 118 or extracted from the textual information 116 may include, but is not limited to, a pace or tempo of a scene, a genre of the scene, one or more characters in the scene, a relationship between the characters, a gender of the characters, an age of the characters, a dialogue audio in the scene, a location of the scene, a sentiment of the scene, an emotion/valence of the scene, a danceability of the scene, or a background ambience of the scene. The determination of the first plurality of features and the second plurality of features is described, for example, at 304 and 308 in FIGS. 3A and 3B and at 404 in FIG. 4A. In an embodiment, the circuitry 202 may match the features determined from the scenes indicated by the textual information 116 with the features determined from the image frames of the corresponding scene of the video content 118, to enhance the quality of the feature extraction for different scenes.

In an embodiment, the determined one or more features may further include, but are not limited to, a relationship between characters in the scene, an emotional state of the characters in the scene, or a geo-location of the scene. The relationship between the characters in the scene may include, but is not limited to, friends, a couple, family, children, or unrelated (crowd). The emotional state of the character in the scene may be related a mood of the character in the scene. For example, the emotional state of the character in the scene may include, but is not limited to a fear state, a happy state, an angry state, a disgust state, a surprise state, an envy state, or a sad state. The geo-location of the scene may be related to a location where the corresponding scene may be captured or recorded. For example, the geo-location of the scene, may include, but is not limited to, a sea, a beach, mountains, forest, a farm, a city, or a village. Different examples of the location of the scene are further described, for example, at 310 in FIG. 3B.

At 504, a relationship between scenes may be determined. In an embodiment, the circuitry 202 may be configured to determine a relationship of each scene of the plurality of scenes in the textual information 116 and in the video content 118, with at least one of a previous scene or a next scene of the scene. Based on the determination of the relationship of each scene with at least one previous scene or next scene of the scene, the circuitry 202 may determine a rating for each scene. The rating may be indicative of whether the particular scene may require an insertion of an audio or song to enhance the appeal of the scene to the audience. The determination of the relationship of each scene of the plurality of scenes and the determination of the rating for each scene of the plurality of scenes in the textual information 116 and in the video content 118 is described, for example, at 306 in FIG. 3A and at 406 in FIG. 4A, respectively. In an embodiment, the circuitry 202 may be further configured to determine at least one of the first set of scenes and at least one of the second set of scenes, to insert an audio file, based on the determined relationship of each scene with at least one of the previous scene or the next scene of the scene. If a relationship is determined between a first scene and a second scene (like previous or next scene), the circuitry 202 may determine the first scene, and the second scene as one of the first set of scenes or one of the second set of scenes to insert the audio file. In another embodiment, the circuitry 202 may determine the first set of scenes and the second set of scenes for insertion of the audio file based on the ratings determined for each of the first set of scenes and second set of scenes (as described at 306 and 406 in FIGS. 3A and 4A).

At 506, a first set of positions and a second set of positions may be determined. In an embodiment, the circuitry 202 may be further configured to determine the first set of positions in the textual information 116 and determine the second set of positions in the received video content based on the one or more features determined based on the first plurality of features and/or the second plurality of features. The first set of audio files and the second set of audio files may be inserted at the determined first set of positions (i.e., related to the first set of scenes indicated by the textual information 116) and at the second set of positions (i.e., related to the second set of scenes of the plurality of scenes in the video content 118), respectively. In an embodiment, the circuitry 202 may be configured to determine the scene analysis quotient information associated with scenes indicated by the textual information 116 and the scenes of the video content 118 as described, for example, in FIGS. 3A, 3B, 4A, and 4B. The circuitry 202 may be configured to determine a genre of the audio file to be inserted at least one scene of the first set of scenes and the second set of scenes based on the determined scene analysis quotient information.

At 508, a first set of audio files, and a second set of audio files may be determined and recommended. in an embodiment, the circuitry 202 may be further configured to determine (or recommend), by the AI engine 108, the first set of audio files for the first set of scenes, and determine (or recommend) the second set of audio files for the second set of scenes based on the determined one or more features. The determination (or the recommendation) of the first set of audio files for insertion at the first set of positions in the textual information 116 and the determination (or the recommendation) of the second set of audio files for insertion at the second set of positions in the video content 118 is described, for example, in FIGS. 3A, 3B, 4A, and 4B.

In an embodiment, the circuitry 202 may be configured to compare the first set of positions determined for the textual information 116 and the second set of positions determined for the video content 118. The circuitry 202 may compare the first set of positions with the second set of positions to determine whether same positions have been determined for the audio insertion based on the analysis of both the textual information 116 and the video content 118 or not. In case the first set of positions and the second set of positions are same in the comparison, then the circuitry 202 may be further configured to determine, by the AI engine 108, only the first set of audio files for insertion at the first set of positions. However, in case the first set of positions and the second set of positions are determined to be different, then the circuitry 202 (using the AI engine 108) may determine the first set of audio files (i.e. from the plurality of audio files stored in the audio database 106) for insertion at the first set of positions in the textual information 116 and determine the second set of audio files for insertion at the second set of positions in the video content 118.

In an embodiment, the determined second set of positions in the received video content 118 based on the determined one or more features, and the determined second set of audio files for the second set of scenes, may be similar to the determined first set of positions in the textual information 116, and the determined first set of audio files for the first set of scenes, respectively. In another embodiment, the determined second set of positions in the received video content 118 and the determined second set of audio files for the second set of scenes, may be different from the determined first set of positions in the textual information 116, and the determined first set of audio files for the first set of scenes, respectively.

At 510, output may be generated. In an embodiment, the circuitry 202 may be configured to control the display device 110 to display the first information corresponding to the determined first set of positions, the first information corresponding to the determined second set of positions, the second information corresponding to the determined first set of audio files and the second information corresponding to the determined second set of audio files, as described for example, in FIGS. 3A, 3B, 4A, and 4B. In an embodiment, the circuitry 202 may receive user inputs (via the I/O device 206) from the first user 114 to finally select or reject at least one audio file from the recommended first set of audio files and the second set of audio files before insertion in the video content 118. The first user 114 may reject certain recommended audio files to limit a number of audio files to be inserted in the video content 118 to further control different factors of the video content 118 (such as, but is not limited to a duration of movie, a quality of a scene, a viewer experience with the scene, or a cost to capture a particular scene including the audio file). Therefore, the combined analysis of the textual information 116 and the video content 118 (say during production or post-production stages) may enhance the quality of recommendation of the audio files (like songs or background music) in the video content 118 (like movies, television shows, short videos, or video game content) at appropriate positions.

Figure 6:
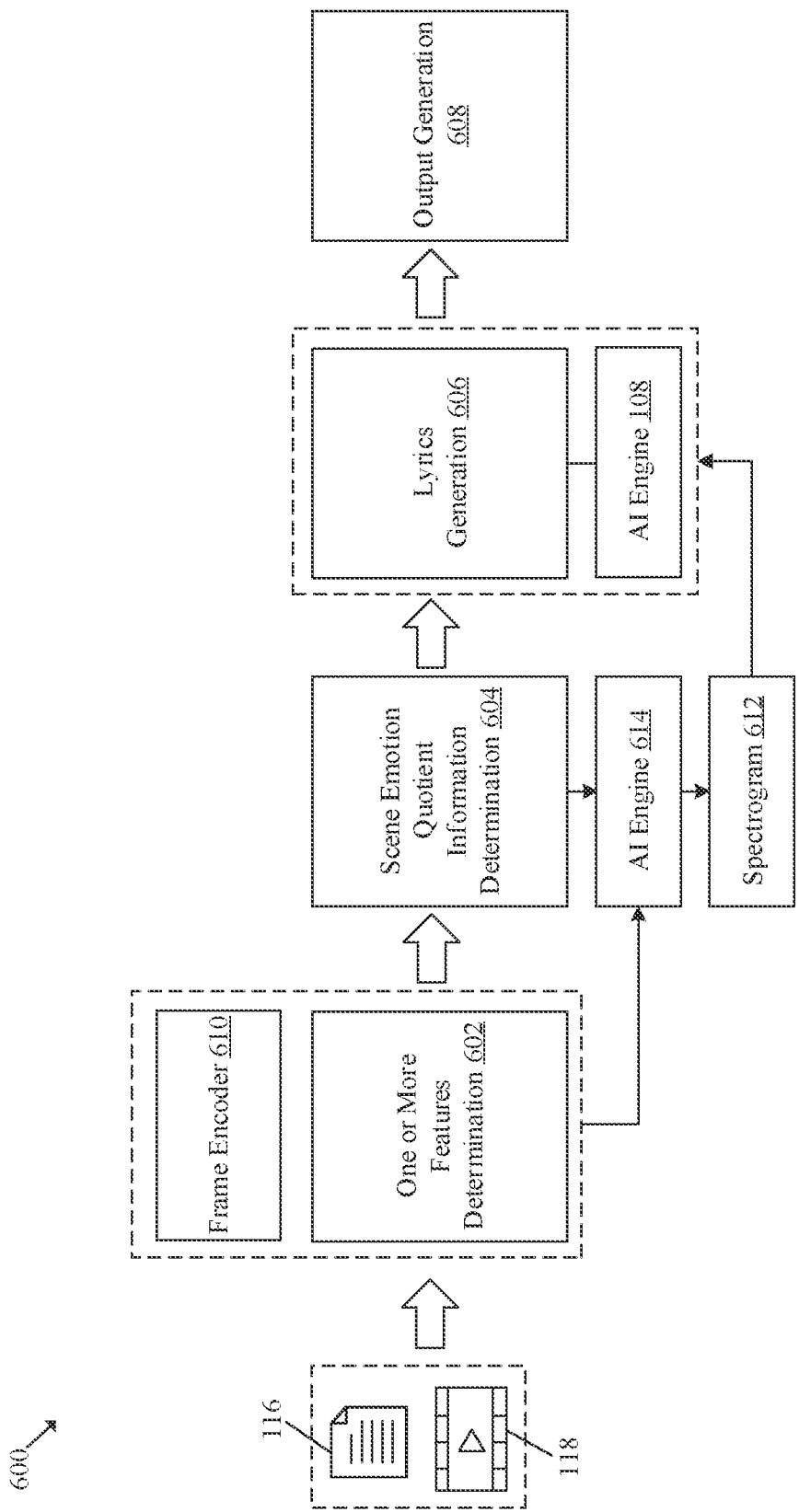
FIG. 6 is a diagram that illustrates an exemplary processing pipeline for lyrics generation based on text information and video content, in accordance with an embodiment of the disclosure.

FIG. 6 is a diagram that illustrates an exemplary processing pipeline for lyrics generation based on text information and video content, in accordance with an embodiment of the disclosure. FIG. 6 is described in conjunction with elements from FIGS. 1, 2, 3A, 3B, 4A, 4B, and 5. With reference to FIG. 6, there is shown a processing pipeline 600. The processing pipeline 600 may include operations from 602 to 608 to depict lyrics generation based on script information and video content. The electronic device 102 in FIG. 1 or the circuitry 202 in FIG. 2 may execute the operations from 602 to 608.

At 602, the one or more features may be determined. In an embodiment, the circuitry 202 may be configured to determine the one or more features of the first plurality of features and/or the second plurality of features from the plurality of scenes indicated by the textual information 116, as described, for example, in FIGS. 3A and 3B. In an embodiment, the circuitry 202 may further determine the one or more features of the first plurality of features and/or the second plurality of features from the plurality of image frames associated with the plurality of scenes of the received video content 118, as described, for example, in FIGS. 4A and 4B. Based on the determination of the one or more features for one (or both) of the textual information 116 and the image frames of the video content 118, the disclosed electronic device 102 may perform the scene analysis for different scenes of one (or both) of the textual information (i.e. script of movie) and the video content (i.e. image frames of the movie).

In an embodiment, the circuitry 202 may be further configured to determine one or more feature points in each frame of the plurality of image frames of the video content 118. Each of the one or more feature points may correspond to information associated with a specific structure, such as points, edges or elementary object or shape components present in each frame. Based on the feature points associated with one or more first objects in each frame, the circuitry 202 may determine, using a frame encoder 610, the one or more features of the first plurality of features and/or the second plurality of features from the plurality of image frames associated with the plurality of scenes of the received video content 118. The one or more features may include, but are not limited to, a location of a scene, one or more characters in the scene, a relationship between the one or more characters in the scene, a plurality of objects in the scene, a genre of the scene, a pace of the scene, a cinematography of the scene, an activity of the scene, ambience of the scene, or dialogues used in the scene. The circuitry 202 may be configured to determine, by the AI engine 108, the plurality of objects in the scene using one or more image processing techniques, such as, image segmentation, face detection methods, object detection methods, deep learning methods, and other methods which may be known to one ordinarily skilled in the art. For example, if the determined one or more features of a frame include a romantic genre, and the frame includes objects like a car and mountains (i.e., determined using the frame encoder 610), the circuitry 202 may accordingly determine one of the second set of audio files for one of the second set of scenes of the video content 118 based on the determined one or more features. In an example, the determined one of the second set of audio files may be related to a scenery of mountains, a romantic context, and/or may mention words related to cars and mountains in their lyrics.

At 604, scene emotion quotient information may be determined. In an embodiment, the circuitry 202 may be configured to determine the scene emotion quotient information for the second set of scenes in the received video content 118, based on the determined one or more features of the first plurality of features and the second plurality of features related to the second set of scenes in the video content 118. The scene emotion quotient information may be related to an assessment of an emotional state of the one or more characters in each scene of the second set of scenes based on the determined one or more features. The emotional state of the one or more characters may be determined based on facial region of the one or more characters. For example, each scene of the second set of scenes may be associated with a set of images frames of the one or more characters over a certain time period. The set of image frames may be utilized to determine a facial expression of each of the one or more characters in the second set of scenes of the video content 118. The facial expression of a character may indicate one or more motions or positions of muscles of a face of the character, where the facial expressions may manifest an emotion. The muscles of the face may move the skin of the character, may create facial lines/folds, or may cause the movement of facial features, such as mouth, head, nose, eye, eyebrows of the character. The circuitry 202 may be configured to determine the emotional state of the character based on the determined facial expression of the character. Examples of the emotional state may include, but are not limited to, a happy emotion, a sad emotion, an angry emotion, a calm emotion, a fear emotion, a neutral emotion, an excited emotion, a confused emotion, a stressed emotion, a disgusted emotion, a surprised emotion, an excitement emotion, or a scared emotion. In addition to the analysis of the video content 118, similarly the circuitry 202 may be configured to determine the scene emotion quotient information based on the features (i.e. first plurality of features and/or the second plurality of features) determined for different scenes indicated by the textual information 116. Based on the analysis of scenes of both the textual information 116 and the video content 118, the determined scene emotion quotient information may be more accurate. In an embodiment, the circuitry 202 may only analyze the video content 118 or only analyze the textual information 116 to determine the scene emotion quotient information for appropriate scenes.

At 606, lyrics information may be generated. In an embodiment, the circuitry 202 may be configured to generate, by the AI engine 108, the lyrics information for at least one of the second set of audio files based on the determined scene emotion quotient information. The lyrics information may be related to a combination of words or phrases generated by the AI engine 108 based on the scene emotion quotient information. The lyrics information may include text information associated with a new song audio file generated based on the determined scene emotion quotient.

In an embodiment, the circuitry 202 may generate, by an AI engine 614, a spectrogram 612 for an audio signal (i.e., music associated with the lyrics information) based on the scene emotion quotient information and the determined one or more features. The AI engine 614 may be trained on a spectrogram generation task. In an embodiment, the AI engine 614 may be implemented as at least one of a machine learning model or a deep learning model. In an embodiment, the AI engine 614 may include electronic data, such as, for example, a software program, code of the software program, libraries, applications, scripts, or other logic or instructions for execution by a processing device, such as the electronic device 102. The AI engine 614 may include code and routines configured to enable a computing device, such as the electronic device 102 to perform one or more operations for generation of the spectrogram 612.

Additionally, or alternatively, the AI engine 614 may be implemented using hardware including, but is not limited to, a processor, a microprocessor (e.g., to perform or control performance of one or more operations), a field-programmable gate array (FPGA), or an application-specific integrated circuit (ASIC). Alternatively, in some embodiments, the trained AI engine 614 may be implemented using a combination of hardware and software. In certain embodiments, the AI engine 614 may be based on a hybrid architecture of multiple Deep Neural Networks (DNNs). Examples of the AI engine 614 may include, but are not limited to, a neural network model or a model based on one or more of regression method(s), instance-based method(s), regularization method(s), decision tree method(s), Bayesian method(s), clustering method(s), association rule learning, and dimensionality reduction method(s). Examples of the AI engine 614 may include a neural network model, such as, but are not limited to, an artificial neural network (ANN), a deep neural network (DNN), a convolutional neural network (CNN), a recurrent neural network (RNN), a CNN-recurrent neural network (CNN-RNN), R-CNN, Fast R-CNN, Faster R-CNN, a You Only Look Once (YOLO) network, a Residual Neural Network (Res-Net), a Feature Pyramid Network (FPN), a Retina-Net, a Single Shot Detector (SSD), and/or a combination thereof.

The circuitry 202 may generate, by use of a spectrogram 612, the audio signal associated with the lyrics information. The spectrogram 612 may correspond to a visual representation of a spectrum (or a time series graph) of frequencies of the generated audio signal associated with the lyrics information. As an example, and not limitation, the spectrogram may be generated by using at least one of a bank of band-pass filters, a Fourier transform function, or a wavelet transform function. In an embodiment, the visual representation of the spectrum may be a heat map representation of frequency spectrum of the audio signal associated with the lyrics information. The AI engine 108 may be trained on a music generation task based on a comparison of the generated audio signal with the pre-defined audio libraries stored in the memory 204. In an embodiment, the circuitry 202 may feed features (i.e., the first plurality of features and/or the second plurality of features) extracted from the textual information 116 and/or from the video content 118 to the AI engine 108, and further control the AI engine 108 and the spectrogram 612 to generate the lyrics information, and generate an audio file for the generated lyrics information.

In an embodiment, the circuitry 202 may generate, by the AI engine 108, particular lyrics information based scene emotion quotient information for a particular scene. For example, in case the one or more characters cry in one of the second set of scenes, the scene emotion quotient information may be determined as a sad emotion. In such scenario, the circuitry 202 may generate the lyrics information that may be indicative of a sad tone and remorseful words, phrases, or expressions. In another example, in case the one or more characters in the scene are determined as victorious or have tears of joy in one of the second set of scenes, the scene emotion quotient information may be determined as a victorious or with a happy emotion. In such scenario, the circuitry 202 may generate the lyrics information that may be indicative of happy, vibrant, or upbeat words, phrases, or expressions. In addition to the generation of the lyrics information based on the features of the scenes of the video content 118, the circuitry 202 may control the AI engine 108 to generate the lyrics information for an audio file based on the features extracted from the scenes indicated by the textual information 116.

In an embodiment, the AI engine 108 may input different features (i.e., the first plurality of features and/or the second plurality of features) extracted either from the scenes in the textual information 116 or extracted from the scenes of the video content 118, or both; and further generate the lyrics information for a particular scene based on the input features. For example, the input features of a particular scene may include, but is not limited to, a genre of scene, genders of characters in the scene, or a sentiment/emotion of the scene. In such case, the AI engine 108 may generate the corresponding lyrics information (for a particular audio file) which may best match the input features of the particular scene.

In an embodiment, the circuitry 202 may generate, by the AI engine 108, the lyrics information based on the one or more features either determined from the plurality of image frames associated with the plurality of scenes of the received video content 118 or determined from the plurality of scenes indicated by the textual information 116, or both. For example, the determined one or more features may indicate the location of the scene as 'Spain', and the genre of the scene as romantic genre, the circuitry 202 may generate the lyrics information based on the determined one or more features from the image frames or from the textual information 116, or both. In such case, the lyrics information may include text corresponding to the location and the genre. For example, the lyrics may include words like "Senorita" to make the lyrics related to the location of the scene, i.e., 'Spain' and appeal to the audience. In an embodiment, the circuitry 202 may control the AI engine 108 to generate the lyrics information for at least one of the recommended first set of audio files (i.e. described, for example, in FIGS. 3A and 3B) and/or for one of the recommended second set of audio files (i.e. described, for example, in FIGS. 4A and 4B).

In certain scenarios, a user, such as, a director or content creator of media content associated with the textual information 116 and/or the video content 118 may create alternate climaxes or storylines of the media content based on an amendment of a certain portion of the textual information 116 and/or the video content 118. For example, a first version of the particular portion of the textual information 116 and/or the video content 118 may be created for a set of happy scenes in the climax or storyline, while a second version of the particular portion of the textual information 116 and/or the video content 118 may be created for a set of sad scenes in the climax or storyline. Based on a user input from the first user 114 (e.g., the director or content creator), one of the two versions may be selected as the selected climax or storyline of the media content. For example, the version may be selected at an editing or post-production stage of the media content. The circuitry 202 may be configured to generate, by the AI engine 108, the lyrics information for the selected version of the climax or storyline of the media content based on the selection of the corresponding version of the particular portion of the textual information 116 and/or the video content 118. In case of any change in the version (for example from a happy scene to a sad scene in the climax or storyline), the lyrics information generated by the AI engine 108 may change as per the version of the textual information 116 or the video content 118 fed to the AI engine 108 or to the disclosed electronic device 102.

At 608, output may be generated. In an embodiment, the circuitry 202 may be configured to control the display device 110 to display third information corresponding to the generated lyrics information for at least one of the second set of audio files and/or for at least one of the first set of audio files. In an embodiment, the circuitry 202 may be configured to generate, by the AI engine 108 and the spectrogram 612, a third set of audio files (i.e., newly generated audio files) for the first set of scenes (i.e., indicated by the textual information 116) based on one or more features of the first plurality of features and the second plurality of features related to the first set of scenes. In another embodiment, the circuitry 202 may be configured to generate, by the AI engine 108 and the spectrogram 612, the third set of audio files for the second set of scenes (i.e., indicated by the image frames of the video content 118) based on one or more features of the first plurality of features and the second plurality of features related to the second set of scenes. The circuitry 202 may be further configured to control the display device 110 to display third information corresponding to the generated third set of audio files. The third set of audio files may include, but is not limited to, a background audio file or a song audio file. In an embodiment, the generated third set of audio files may include, but is not limited to, a modified version of at least one the determined first set of audio files, a modified version of at least one of the second set of audio files from the stored plurality of audio files, and newly generated original audio files). The modified version may correspond to a remix or remake of the first set of audio files and/or the second set of audio files determined from the audio database 106.

Figure 7:
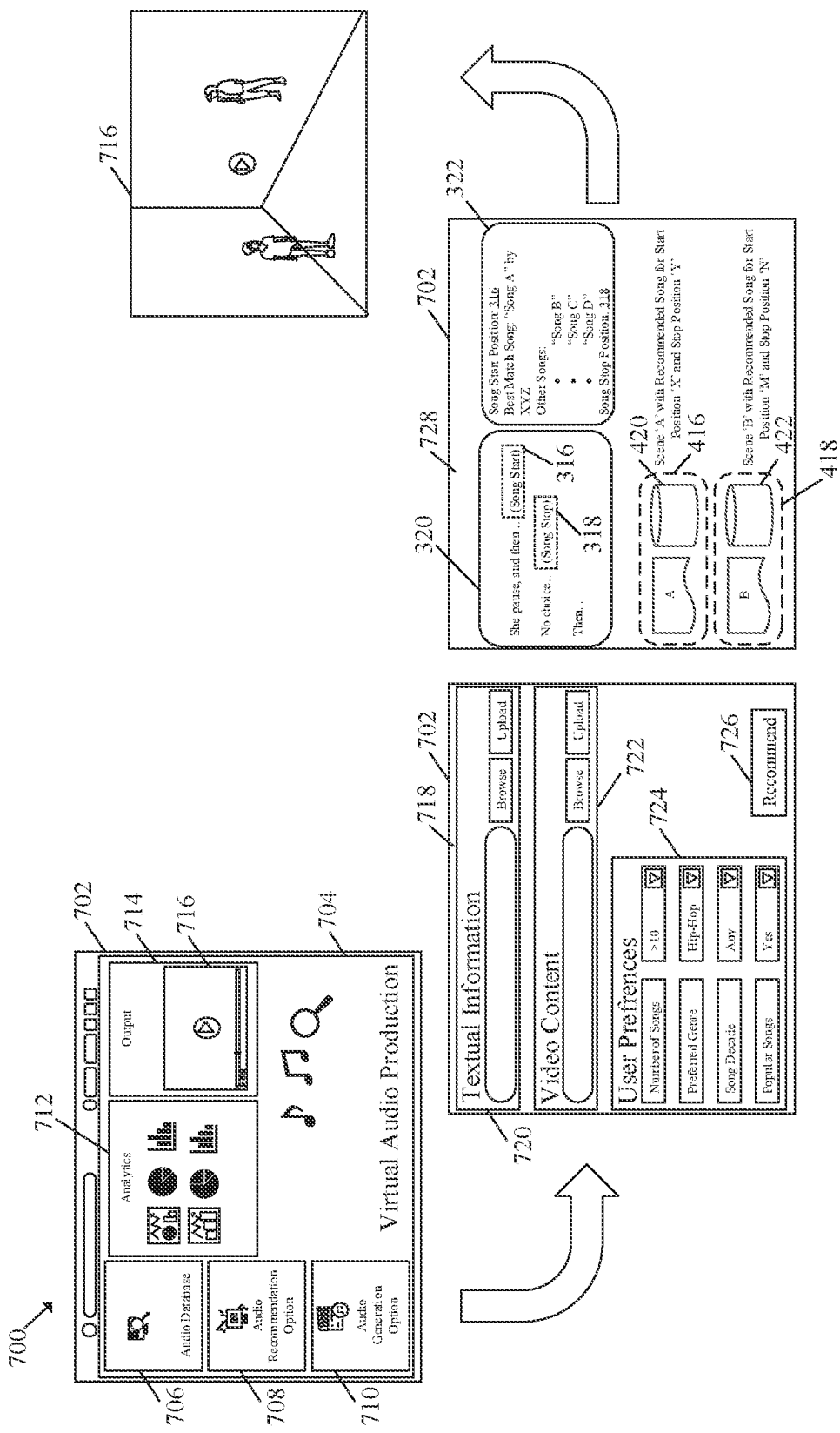
FIG. 7 is a diagram that illustrates an exemplary scenario for virtual audio recommendation based on text information and video content, in accordance with an embodiment of the disclosure.

FIG. 7 is a diagram that illustrates an exemplary scenario for virtual audio recommendation based on text information and video content, in accordance with an embodiment of the disclosure. FIG. 7 is described in conjunction with elements from FIGS. 1, 2, 3A, 3B, 4A, 4B, 5, and 6. With reference to FIG. 7, there is shown an exemplary scenario 700. The exemplary scenario 700 may depict virtual audio recommendation based on the text information and the video content.

The electronic device 102 may control the display device 110 to display an application interface 702. The application interface 702 may correspond to a user interface (UI) rendered on a display device, such as the display device 110. The application interface 702 may be configured to display, but not limited to, an audio recommendation option or an audio generation option. An example of the application interface 702 may include, but is not limited to, a graphical user interface (GUI). In an embodiment, the circuitry 202 may be configured to receive a user input indicative of selection at least one of the audio recommendation option, or the audio generation option.

As an example, in FIG. 7, the application interface 702 may include a first user interface (UI) 704 for virtual audio recommendation based on the text information (such as script information) and the video content. The first UI 704 may include a plurality of user interface (UI) elements. As an example, there is shown a first UI element 706, a second UI element 708, and a third UI element 710, through which the user input may be accepted from the first user 114. The first UI element 706, the second UI element 708, and the third UI element 710 may be for example, a button that may be configured to receive a user input indicative of a selection of audio database (such as the audio database 106), an audio recommendation option, or an audio generation option, respectively. Based on the user input of a selection of the audio database, the circuitry 202 may enable a manual navigation for the first user 114 through the stored plurality of audio files. In an example, when the received user input is indicative of the selection of the audio recommendation option, the circuitry 202 may be configured to determine the first set of audio files for the first set of scenes, as described, for example, in FIGS. 3A, 3B, 4A, 4B, and 5. In another example, when the received user input is indicative of the audio generation option, the circuitry 202 may be configured to generate the lyrics information and the audio signal associated with the lyrics information, as described, for example, in FIG. 6.

As an example, there is shown a fourth UI element 712, and a fifth UI element 714 through which an output may be displayed to the first user 114. The fourth UI element 712 may be configured to display information which may include analytics information corresponding to the stored plurality of audio files, and current market trends regarding audio recommendations. The fifth UI element 714 may be configured to display the generated output which may include at least one of the first set of audio files or the second set of audio files inserted in the received video content at the determined first set of positions or the second set of positions, respectively.

After selection of the at least one of the audio recommendation option or the audio generation option, the application interface 702 may display a second user interface (UI) 718. As an example, the second UI 718 may further include a sixth UI element 720, a seventh UI element 722, an eighth UI element 724, and a ninth UI element 726, through which the user input may be accepted from the first user 114.

The sixth UI element 720, and the seventh UI element 722 may correspond to, for example, a file upload UI element (such as, but not limited to, a dialog box). The sixth UI element 720 may be configured to receive the textual information 116 (like textual script), as described for example, at 302 in FIG. 3A. The seventh UI element 722 may be configured to receive the video content 118, as described for example, at 402 in FIG. 4A. The eighth UI element 724 may correspond to, for example, a set of list box UI elements configured to receive user preferences associated with a selection of the first set of audio files. For example, the user preference may include selection of a number of songs (audio files) to be inserted in the received video content 118. In another example, the user preference may include selection of a preferred genre of the audio files to be inserted in the received video content 118. In an example, the user preference may include selection of a decade or an era to which the songs (audio files) may belong. In another example, the user preference may include indication of whether or not the songs (audio files) to be inserted in the received video content 118 should be popular. It may be noted that the user preferences shown in FIG. 7, is presented merely an example. The ninth UI element 726 may be, for example, a button (such as a "Recommend" button) that may be configured to receive a user confirmation to determine at least one of the first set of audio files or the second set of audio files based on the received user inputs, via the second user interface (UI) 718.

Based on the determination of the first set of audio files or the second set of audio files, the circuitry 202 may be configured to control the display device 110 to display the first information corresponding to the determined first set of positions, the first information corresponding to the determined second set of positions, the second information corresponding to the determined first set of audio files and the second information corresponding to the determined second set of audio files. As an example, the application interface 702 may display a third user interface (UI) 728. As an example, the third UI 728 may display the first information corresponding to the determined first set of positions, the first information corresponding to the determined second set of positions, the second information corresponding to the determined first set of audio files and the second information corresponding to the determined second set of audio files, as described for example, in FIGS. 3A, 3B, 4A, and 4B. In an embodiment, the circuitry 202 may be configured to control the display device 110 to display updated video content 716 which may include at least one of the determined first set of audio files or the second set of audio files inserted at the determined first set of positions or the second set of positions, respectively.

Figure 8:
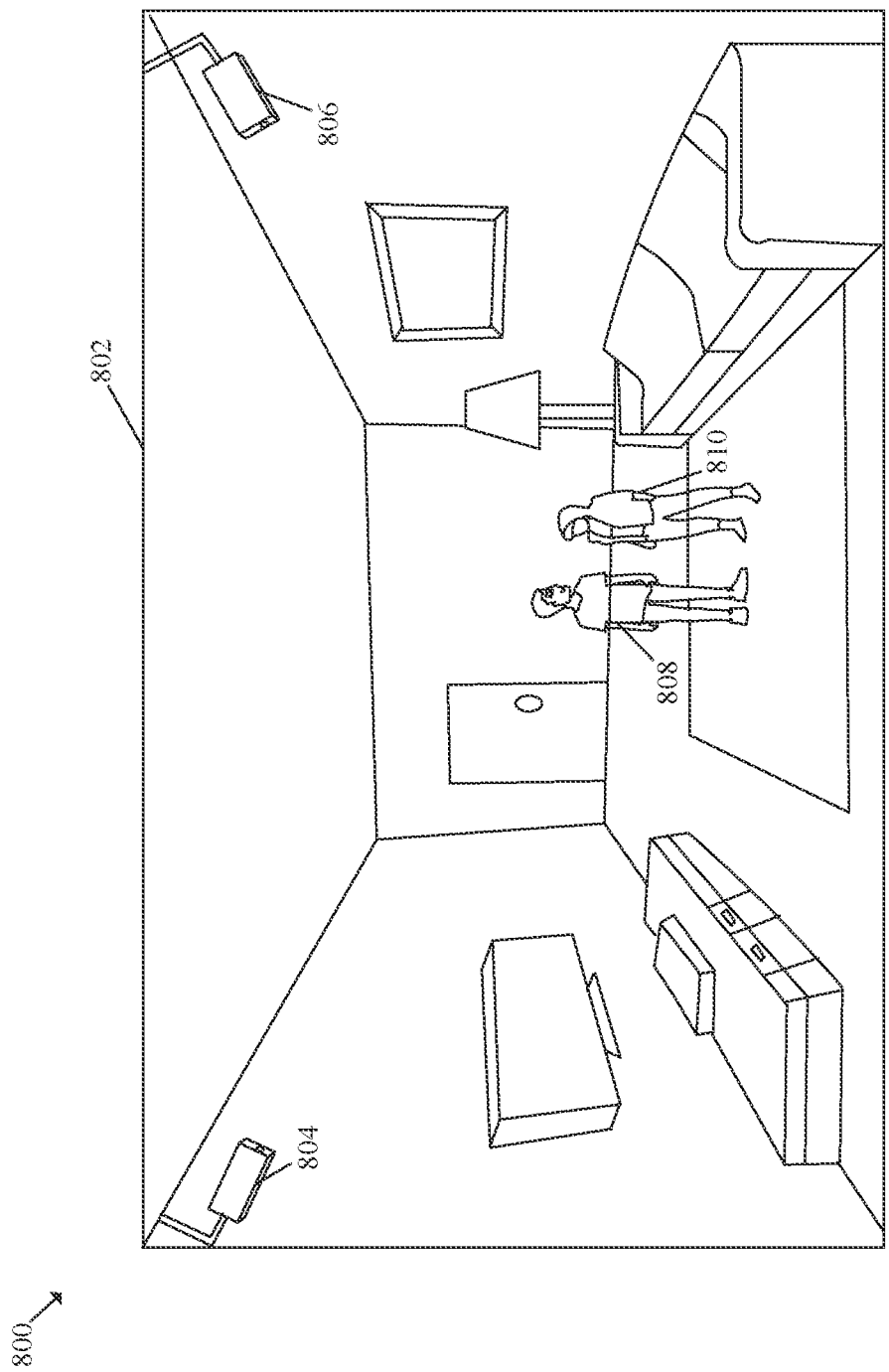
FIG. 8 is a diagram that illustrates an exemplary scenario for audio recommendation based on real-time capture of video content, in accordance with an embodiment of the disclosure.

FIG. 8 is a diagram that illustrates an exemplary scenario for audio recommendation based on real-time video content, in accordance with an embodiment of the disclosure. FIG. 8 is described in conjunction with elements from FIGS. 1, 2, 3A, 3B, 4A, 4B, 5, 6, and 7. With reference to FIG. 8, there is shown an exemplary scenario 800. The exemplary scenario 800 may depict a shot 802 of a scene of the video content 118 (i.e. for example under production). The scene may include one or more image sensors (such as a first image sensor 804 and a second image sensor 806), and one or more characters/actors (such as a first character 808 and a second character 810). The first image sensor 804 and the second image sensor 806 may be the cameras used while shooting the shot 802 during the production stage of the video content 118.

The circuitry 202 may be further communicatively coupled with the one or more image sensors to capture a plurality of image frames related to a plurality of shots (such as the shot 802) of the scene. The one or more image sensors (such as the first image sensor 804 and the second image sensor 806) may include suitable logic, circuitry, and/or interfaces that may be configured to capture images based on light, which may be incident on the one or more image sensors. The captured images may correspond to one or more image frames of the scene (or the shot 802) in a field-of-view (FOV) of an imaging unit, which may include the one or more image sensors. The one or more image sensors may be a camera device (such as, but are not limited to, a wide-angle camera, an action camera, a closed-circuit television (CCTV) camera, a camcorder, a digital camera, a camera phone, a time-of-flight camera (ToF camera), a night-vision camera, and/or another image capture device), separate from or integrated into the electronic device 102. Examples of the one or more image sensors may include, but are not limited to, a passive pixel sensor, an active pixel sensor, a semiconductor charged coupled device (CCD) based image sensor, a Complementary metal-oxide-semiconductor (CMOS)-based image sensor, a backlit CMOS sensor with a global shutter, a Silicon-on-Insulator (SOI)-based single-chip image sensor, an N-type metal-oxide-semiconductor based image sensor, a flat panel detector, or other variants of an image sensor.

In an embodiment, the circuitry 202 may be further communicatively coupled with one or more audio capturing devices (not shown) to capture a plurality of audio signals related to the plurality of shots (such as the shot 802) of the scene. The one or more audio capturing devices may include suitable logic, circuitry, and/or interfaces that may be configured to capture the plurality of audio signals related to the plurality of shots (such as the shot 802) of the scene. The one or more audio capturing devices may further generate a frequency response of the captured plurality of audio signals. In some embodiments, the one or more audio capturing devices may be communicatively coupled with one or more image sensors (such as the first image sensor 804 and the second image sensor 806). In some embodiments, the one or more audio capturing devices may be integrated within the one or more image sensors and the entire functionality of the one or more audio capturing devices may be included in one or more image sensors.

Examples of one or more audio capturing devices may include, but are not limited to, a recorder, an electret microphone, a dynamic microphone, a stereo microphone, a carbon microphone, a piezoelectric microphone, a fiber microphone, a micro-electro-mechanical-systems (MEMS) microphone, or other microphones.

The circuitry 202 may be further configured to determine one or more features (i.e., out of the first plurality of features and the second plurality of features) from the captured plurality of image frames of the plurality of shots (such as, the shot 802) of the scene. In an embodiment, the circuitry 202 may be further configured to determine one or more features from the captured plurality of audio signals related to the plurality of shots (such as the shot 802) of the scene. The determination of the first plurality of features and the second plurality of features from the image frames is described, for example, in FIGS. 4A, 4B, 5, and 6. The circuitry 202 may be further configured to determine a third set of positions in the plurality of shots of the scene based on the determined one or more features. The determination of the positions (i.e. placeholder positions to insert audio files) based on the features of the scene is described, for example, at 408 in FIG. 4A. A fourth set of audio files may be inserted at the determined third set of positions which are related to a set of shots of the scene from the plurality of shots. The third set of positions may include, but is not limited to, a set of start positions and a set of end positions based on which the fourth set of audio files may be reproduced. The fourth set of audio files may include, but is not limited to, a background audio file or a song audio file. The determination of the third set of positions may be similar to the determination of the first set of positions, and the second set of positions, as described, for example, in FIGS. 3A, 3B, 4A, 4B, and 5.

The circuitry 202 may be further configured to determine, by the AI engine 108, the fourth set of audio files for the set of shots scenes, based on the determined one or more features. For example, when the plurality of image frames related to the plurality of shots may be captured in real-time (i.e. while shooting of the scene or during production of the video content 118), a user (for example, a director of a movie associated with the video content 118) may modify a particular scene of the video content 118 as compared to an original version of the scene in the received textual information 116. The modification of the particular scene may lead to a change of a context of the scene with respect to a context of the original version of the scene. As a result, the determined first set of the audio files, and/or the second set of audio files may no longer be an appropriate choice for the particular scene. Therefore, the disclosed electronic device 102 may be configured to determine, by the AI engine 108, the fourth set of audio files for the plurality of shots of the scene in a real-time scenario. The fourth set of audio files determined for the plurality of shots of the particular scene (i.e. under production) may be more related to the modified or latest version of the scene captured in the real-time, as compared to the first set of audio files that may be related to the original version of the scene and determined based on the textual information 116 (i.e. determined during the pre-production stage using the text script). Thus, the fourth set of audio file may appeal to the audience of the modified version of the scene as compared to the first set of audio files determined based on the original textual information 116. The determination of the fourth set of audio files may be similar to the determination of the first set of audio files, and the second set of audio files, as described, for example, in FIGS. 3A, 3B, 4A, 4B, and 5.

In an embodiment, the circuitry 202 may be further configured to generate, by the AI engine 108, recommendations associated with the capture of the plurality of image frames related to the plurality of shots (such as the shot 802) of the scene, based on the determined fourth set of audio files. Based on the determined fourth set of audio files, the first user 114 (like a director, a producer, or an actor) may want to modify one or more shots of the scene to further enhance a quality of the captured plurality of image frames related to the shots while shooting the scene of the video content 118. For example, the generated recommendations based on the determined fourth set of audio files during production of the scene may include, but are not limited to, a modification in a placement or field of view of the one or more image sensors to capture the plurality of image frames related to the plurality of shots, a modification of one or more visual effects of the scene, a modification of one or more parameters (like, but not limited to, zoom, aperture, focus, ISO, or particular mode) of the one or more image sensors, a modification in a number of image sensors used to capture the shot, a modification in one or more features such as ambience of the scene, or a change in a location of the scene, or a modification in a number of the characters/actors present in the scene. The modification in a placement of the one or more image sensors to capture the plurality of image frames related to the plurality of shots may be related to a change in location where the one or more image\ sensors may be placed to capture the image frames. The modification of one or more visual effects of the scene may be related to change in one or more of, but is not limited to, lighting, graphics, colors, background, and/or saturation of the captured scene. Such modification while shooting one or more shots of the scene may ensure that the captured image frames of the scene and the determined fourth set of audio files for the scene may complement each other. This may also provide a seamless transition between the plurality of scenes, and an appeal to the audience of the captured video content 118. The scenario 800 is for exemplary purposes and may not be construed as limiting the scope of the disclosure. Hence, the disclosed electronic device 102 (using the AI engine 108) may be robust enough to automatically analyze the textual information 116 (like textual script) and the related video content 118 during multiple stages (like pre-production, during production, and post-production), determine the positions for audio insertion, recommend audio files (i.e. both in the forms of songs and background music), and generate the lyrics information for new audio files based on the real-time analysis of the scenes indicated in the textual information 116 and/or the video content 118.

Figure 9:
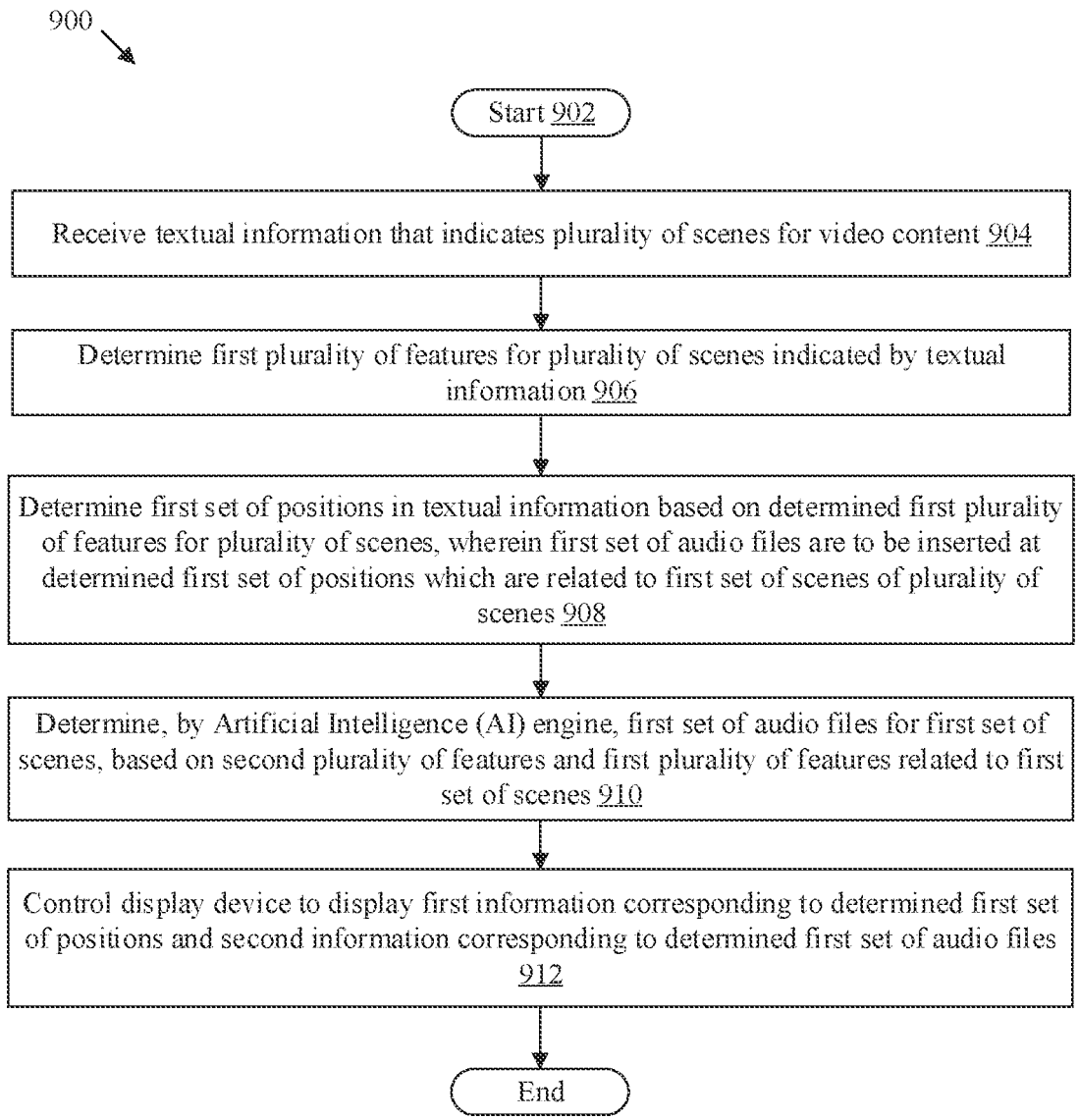
FIG. 9 is a flowchart that illustrates exemplary operations for audio recommendation based on text information, in accordance with an embodiment of the disclosure.

FIG. 9 is a flowchart that illustrates exemplary operations for audio recommendation based on textual information, in accordance with an embodiment of the disclosure. FIG. 9 is described in conjunction with elements from FIGS. 1, 2, 3A, 3B, 4A, 4B, 5, 6, 7, and 8. With reference to FIG. 9, there is shown a flowchart 900. The flowchart 900 may include operations from 902 to 912 and may be implemented by the electronic device 102 of FIG. 1 or by the circuitry 202 of FIG. 2. The flowchart 900 may start at 902 and proceed to 904.

At 904, textual information (for example, the textual information 116) may be received. In an embodiment, the circuitry 202 may be configured to receive the textual information 116 that may indicate a plurality of scenes (for example, the plurality of scenes 302A) for video content. The textual information may include, for example, a textual script, a textual narration, textual feeds, textual dialogues, or a textual manuscript of the plurality of scenes of the video content. The reception of the textual information 116 is described, for example, at 302 in FIG. 3A.

At 906, a first plurality of features may be determined. In an embodiment, the circuitry 202 may be configured to determine the first plurality of features for the plurality of scenes 302A indicated by the textual information 116. Examples of the first plurality of features for the plurality of scenes 302A indicated by the textual information 116 may include, but are not limited to, at least one of an occasion of a scene, an activity of the scene, a duration of the scene, a non-verbal scene, a transition of the scene, a prominent character in the scene, an introduction of the prominent character in the scene, a narration in the scene, or an audio-insertable position in the scene. The determination of the first plurality of features is described, for example, at 304 in FIG. 3A.

At 908, a first set of positions may be determined. In an embodiment, the circuitry 202 may be configured to determine the first set of positions in the textual information 116 based on the determined first plurality of features for the plurality of scenes 302A. As an example, the first set of positions may include at least one of a set of start positions and a set of end positions based on which a first set of audio files may be reproduced. The first set of audio files may be inserted at the determined first set of positions which are related to a first set of scenes of the plurality of scenes 302A. As an example, the first set of audio files may include at least one of a background audio file or a song audio file. The determination of the first set of positions is described, for example, at 308 in FIG. 3A.

At 910, the first set of audio files may be determined. In an embodiment, the circuitry 202 may be configured to determine, by an artificial intelligent (AI) engine 108, the first set of audio files for the first set of scenes, based on a second plurality of features and the first plurality of features related to the first set of scenes. Examples of the second plurality of features related to the first set of scenes may include, but are not limited to, at least one of a pace or tempo of a scene, a genre of the scene, one or more characters in the scene, a dialogue audio in the scene, a sentiment of the scene, a danceability of the scene, or a background ambience of the scene. The determination of the first set of audio files is described, for example, at 310 in FIG. 3B.

At 912, a display device (for example, the display device 110) may be controlled. In an embodiment, the circuitry 202 may be configured to control the display device 110 to display first information corresponding to the determined first set of positions and second information corresponding to the determined first set of audio files. The control of the display device 110 is described, for example, at 312 in FIG. 3B. Control may pass to end.

Although the flowchart 900 is illustrated as discrete operations, such as 904, 906, 908, 910, and 912, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 10:
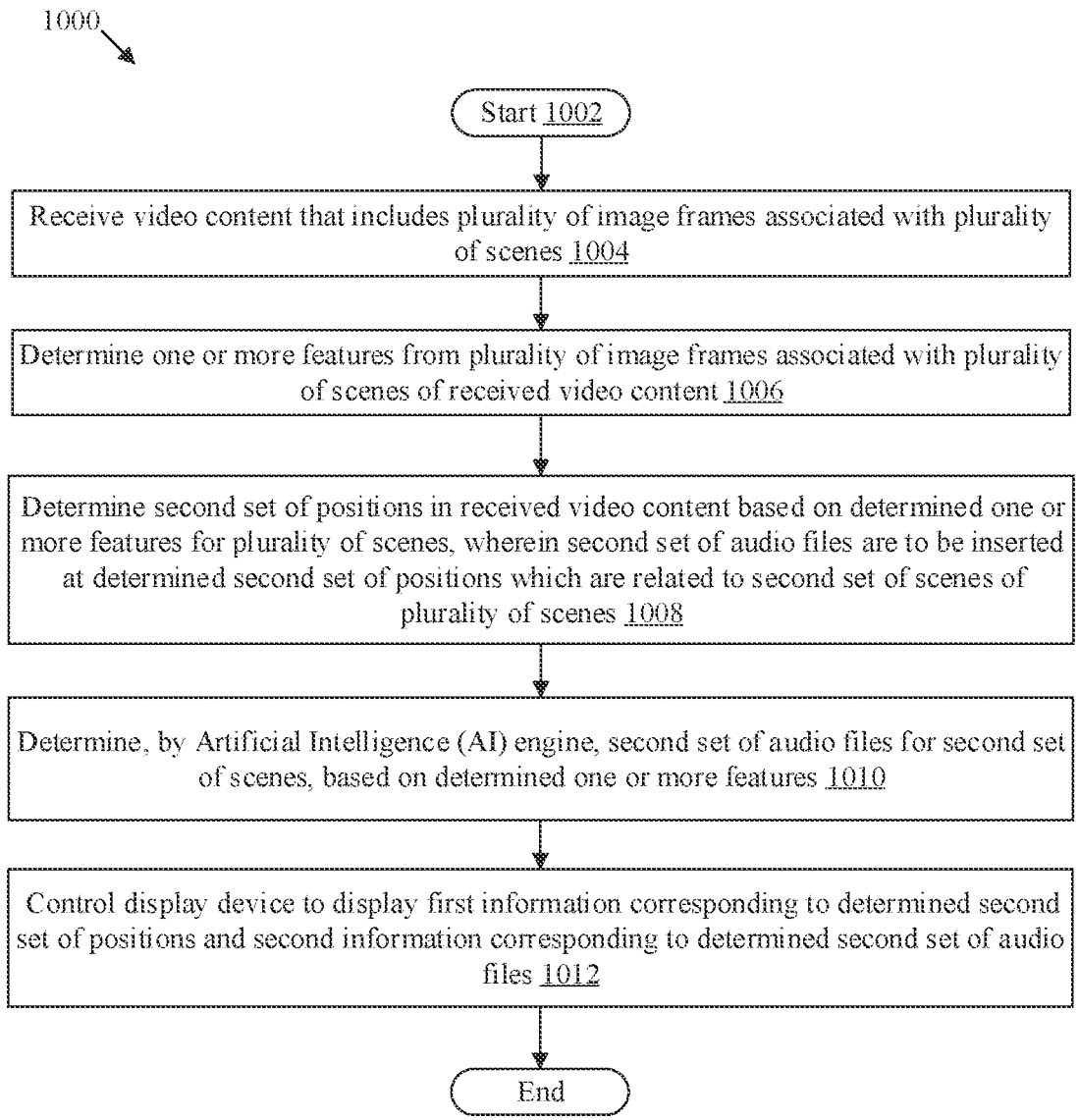
FIG. 10 is a flowchart that illustrates exemplary operations for audio recommendation based on video content, in accordance with an embodiment of the disclosure.

FIG. 10 is a flowchart that illustrates exemplary operations for audio recommendation based on video content, in accordance with an embodiment of the disclosure. FIG. 10 is described in conjunction with elements from FIGS. 1, 2, 3A, 3B, 4A, 4B, 5, 6, 7, 8, and 9. With reference to FIG. 10, there is shown a flowchart 1000. The flowchart 1000 may include operations from 1002 to 1012 and may be implemented by the electronic device 102 of FIG. 1 or by the circuitry 202 of FIG. 2. The flowchart 1000 may start at 1002 and proceed to 1004.

At 1004, video content (for example, the video content 118) may be received. In an embodiment, the circuitry 202 may be configured to receive the video content 118 that includes a plurality of image frames associated with a plurality of scenes. The reception of the video content 118 is described, for example, at 402 in FIG. 4A.

At 1006, one or more features may be determined. In an embodiment, the circuitry 202 may be configured to determine the one or more features from the plurality of image frames associated with the plurality of scenes of the received video content 118. Examples of the one or more features for the plurality of image frames may include, but are not limited to, at least one of one or more characters in a scene, a dialogue audio in the scene, a background ambience of the scene, a relationship between characters in the scene, an emotional state of the characters in the scene, or a geo-location of the scene. The determination of the one or more features is described, for example, at 404 in FIG. 4A.

At 1008, a second set of positions may be determined. In an embodiment, the circuitry 202 may be configured to determine the second set of positions in the received video content 118 based on the determined one or more features for the plurality of scenes. As an example, the second set of positions may include at least one of a set of start positions and a set of end positions based on which a second set of audio files may be reproduced. The second set of audio files may be inserted at the determined second set of positions which are related to a second set of scenes of the plurality of scenes. As an example, the second set of audio files may include at least one of a background audio file or a song audio file. The determination of the second set of positions is described, for example, at 408 in FIG. 4A.

At 1010, the second set of audio files may be determined. In an embodiment, the circuitry 202 may be configured to determine, by the AI engine 108, the second set of audio files for the second set of scenes, based on the determined one or more features. The determination of the second set of audio files is described, for example, at 410 in FIG. 4B.

At 1012, a display device (for example, the display device 110) may be controlled. In an embodiment, the circuitry 202 may be configured to control the display device 110 to display first information corresponding to the determined second set of positions and second information corresponding to the determined second set of audio files. The control of the display device 110 is described, for example, at 412 in FIG. 4B. Control may pass to end.

Although the flowchart 1000 is illustrated as discrete operations, such as 1004, 1006, 1008, 1010, and 1012, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate an electronic device (for example, the electronic device 102). The instructions may cause the electronic device 102 to perform operations that include retrieval of textual information (for example, the textual information 116) that indicates a plurality of scenes for video content. The operations may further include determination of a first plurality of features for the plurality of scenes indicated by the textual information 116. The operations may further include determination of a first set of positions in the textual information 116 based on the determined first plurality of features for the plurality of scenes. A first set of audio files may be inserted at the determined first set of positions which are related to a first set of scenes of the plurality of scenes. The operations may further include determination of, by an artificial intelligent (AI) engine (for example, the AI engine 108), the first set of audio files for the first set of scenes, based on a second plurality of features and the first plurality of features related to the first set of scenes. The operations may further include control of a display device (for example, the display device 110) to display first information corresponding to the determined first set of positions and second information corresponding to the determined first set of audio files.

Various embodiments of the disclosure may provide a non-transitory computer readable medium and/or storage medium having stored thereon, instructions executable by a machine and/or a computer to operate an electronic device (for example, the electronic device 102). The instructions may cause the electronic device 102 to perform operations that include retrieval of video content (for example, the video content 118) that includes a plurality of images frames. The operations may further include determination of one or more features from the plurality of image frames associated with the plurality of scenes of the received video content 118. The operations may further include determination a second set of positions in the received video content 118 based on the determined one or more features for the plurality of scenes. A second set of audio files are to be inserted at the determined second set of positions which are related to a second set of scenes of the plurality of scenes. The operations may further include determination of, by an artificial intelligent (AI) engine (for example, the AI engine 108), the second set of audio files for the second set of scenes, based on the determined one or more features. The operations may further include control of a display device (for example, the display device 110) to display first information corresponding to the determined second set of positions and second information corresponding to the determined second set of audio files.

Exemplary aspects of the disclosure may provide an electronic device (such as, the electronic device 102 of FIG. 1) that includes circuitry (such as, the circuitry 202). The circuitry 202 may be configured to receive textual information (for example, the textual information 116) that indicates a plurality of scenes for video content. The circuitry 202 may be further configured to determine a first plurality of features for the plurality of scenes indicated by the textual information 116. The circuitry 202 may be further configured to determine a first set of positions in the textual information 116 based on the determined first plurality of features for the plurality of scenes. A first set of audio files may be inserted at the determined first set of positions which are related to a first set of scenes of the plurality of scenes. The circuitry 202 may be further configured to determine, by an artificial intelligent (AI) engine (for example, the AI engine 108), the first set of audio files for the first set of scenes, based on a second plurality of features and the first plurality of features related to the first set of scenes. The circuitry 202 may be further configured to control a display device (for example, the display device 110) to display first information corresponding to the determined first set of positions and second information corresponding to the determined first set of audio files.

In an embodiment, the first plurality of features for the plurality of scenes indicated by the textual information 116 may include at least one of an occasion of a scene, an activity of the scene, a duration of the scene, a non-verbal scene, a transition of the scene, a prominent character in the scene, an introduction of the prominent character in the scene, a narration in the scene, or an audio-insertable position in the scene.

In an embodiment, the first set of audio files may include at least one of a background audio file or a song audio file. In an embodiment, the first set of positions may include at least one of a set of start positions and a set of end positions based on which the first set of audio files may be reproduced.

In an embodiment, the second plurality of features related to the first set of scenes may include at least one of a pace or tempo of a scene, a genre of the scene, one or more characters in the scene, a relationship between the characters, a gender of the characters, an age of the characters, a dialogue audio in the scene, a sentiment of the scene, an emotion of the scene, a danceability of the scene, or a background ambience of the scene.

In an embodiment, the circuitry 202 may be configured to determine a relationship of each scene of the plurality of scenes with at least one of a previous scene or a next scene of each scene. The circuitry 202 may be further configured to determine at least one of the first set of scenes, to insert an audio file, based on the determined relationship.

In an embodiment, the circuitry 202 may be configured to determine scene analysis quotient information for each scene of the first set of scenes based on the determined first plurality of features for the plurality of scenes. The circuitry 202 may be further configured to determine a genre of an audio file to be inserted for each scene of the first set of scenes based on determined the scene analysis quotient information. The circuitry 202 may be further configured to determine, by the artificial intelligent (AI) engine 108, the first set of audio files for the first set of scenes based on the determined genre.

In an embodiment, the circuitry 202 may be configured to receive a user input indicative of the first set of positions in the textual information 116. The circuitry 202 may be further configured to determine the first set of positions in the textual information 116 based on the received user input.

In an embodiment, the circuitry 202 may be configured to determine user profile information associated with a first user. The user profile information comprises preferences of the first user to insert an audio file of the first set of audio files, a genre of a scene to insert the audio file, or historical data related to the audio file. The circuitry 202 may be further configured to determine, by the AI engine 108, the first set of audio files for the first set of scenes, based on the determined user profile information.

In an embodiment, the circuitry 202 may be configured to compare, by the AI engine 108, one or more features from the first plurality of features and the second plurality of features with a third plurality of features of a plurality of audio files stored in an audio database. The third plurality of features may include at least one of lyrics information, an emotion, a sentiment, a danceability, a language, a popularity, acoustics, a loudness, a speechiness, a liveness, an occasion, a genre, instrument information, a tempo, a singer name, a music composer name, or a gender of the singer of the plurality of audio files. The circuitry 202 may be further configured to determine the first set of audio files from the plurality of audio files stored in the audio database based on the comparison.

In an embodiment, the circuitry 202 may be configured to receive user input indicative of a selection of the first set of scenes from the plurality of scenes for which the first set of audio files may be inserted. The circuitry 202 may be further configured to determine, by the artificial intelligent (AI) engine 108, the first set of audio files for the first set of scenes based on the received user input.

In an embodiment, the circuitry 202 may be configured to receive the video content associated with the textual information 116. The circuitry 202 may be further configured to determine one or more features of the first plurality of features and the second plurality of features from a plurality of image frames associated with the plurality of scenes of the received video content. The circuitry 202 may be further configured to determine a second set of positions in the received video content based on the determined one or more features. A second set of audio files may be inserted at the determined second set of positions which are related to a second set of scenes of the plurality of scenes. The circuitry 202 may be further configured to determine, by the AI engine 108, the second set of audio files for the second set of scenes based on the determined one or more features. The circuitry 202 may be further configured to control the display device 110 to display the first information corresponding to the determined second set of positions and the second information corresponding to the determined second set of audio files.

In an embodiment, the determined one or more features may include at least one of a relationship between characters in the scene, an emotional state of the characters in the scene, or a geo-location of the scene.

In an embodiment, the circuitry 202 may be configured to determine scene emotion quotient information for the second set of scenes in the received video content, based on the determined one or more features of the plurality of first features and the plurality of second features. The circuitry 202 may be further configured to generate, by the AI engine 108, lyrics information for at least one of the second set of audio files based on the determined scene emotion quotient information. The circuitry 202 may be further configured to control the display device 110 to display third information corresponding to the generated lyrics information for the at least one of the second set of audio files.

In an embodiment, the circuitry 202 may be configured to compare the first set of positions in the textual information 116, and the second set of positions in the received video content. The circuitry 202 may be further configured to determine, by the AI engine, the first set of audio files based on the comparison.

In an embodiment, the circuitry 202 may be configured to generate, by the AI engine 108, a third set of audio files for the first set of scenes based on one or more features of the first plurality of features and the second plurality of features related to the first set of scenes. The circuitry 202 may be further configured to control the display device 110 to display third information corresponding to the generated third set of audio files.

In an embodiment, the circuitry 202 may be further communicatively coupled with one or more image sensors (e.g., the first image sensor 804 and the second image sensor 806) to capture a plurality of image frames related to a plurality of shots of a scene. The circuitry 202 may be further configured to determine one or more features of the first plurality of features and the second plurality of features from the plurality of shots of the scene related to the captured plurality of image frames. The circuitry 202 may be further configured to determine a third set of positions in the plurality of shots of the scene based on the determined one or more features. A fourth set of audio files may be inserted at the determined third set of positions which are related to a set of shots of the scene from the plurality of shots. The circuitry 202 may be further configured to determine, by the AI engine 108, the fourth set of audio files for the set of shots scenes, based on the determined one or more features. In an embodiment, the circuitry 202 may be further configured to generate, by the AI engine 108, recommendations associated with the capture of the plurality of image frames related to the plurality of shots of the scene, based on the determined fourth set of audio files.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
 circuitry configured to:
   receive textual information that indicates a plurality of scenes for video content;

determine a first plurality of features for the plurality of scenes indicated by the textual information;

determine a first set of positions in the textual information based on the determined first plurality of features for the plurality of scenes, wherein a first set of audio files are to be inserted at the determined first set of positions which are related to a first set of scenes of the plurality of scenes;

determine scene analysis quotient information for each scene of the first set of scenes based on the determined first plurality of features for the plurality of scenes;

determine a genre of an audio file to be inserted for each scene of the first set of scenes based on determined the scene analysis quotient information;

determine, by an artificial intelligent (AI) engine, the first set of audio files for the first set of scenes, based on the determined genre, a second plurality of features and the first plurality of features related to the first set of scenes; and control a display device to display first information corresponding to the determined first set of positions and second information corresponding to the determined first set of audio files.

2. The electronic device according to claim 1, wherein the first plurality of features for the plurality of scenes indicated by the textual information comprises at least one of an occasion of a scene, an activity of the scene, a duration of the scene, a non-verbal scene, a transition of the scene, a prominent character in the scene, an introduction of the prominent character in the scene, a narration in the scene, or an audio-insertable position in the scene.

3. The electronic device according to claim 1, wherein the first set of audio files comprises at least one of a background audio file or a song audio file.

4. The electronic device according to claim 1, wherein the first set of positions comprise at least one of a set of start positions and a set of end positions based on which the first set of audio files are to be reproduced.

5. The electronic device according to claim 1, wherein the second plurality of features related to the first set of scenes comprises at least one of a pace or tempo of a scene, a genre of the scene, one or more characters in the scene, a relationship between the characters, a gender of the characters, an age of the characters, a dialogue audio in the scene, a sentiment of the scene, an emotion of the scene, a danceability of the scene, or a background ambience of the scene.

6. The electronic device according to claim 1, wherein the circuitry is further configured to:
determine a relationship of each scene of the plurality of scenes with at least one of a previous scene or a next scene of each scene; and
determine at least one of the first set of scenes, to insert the audio file, based on the determined relationship.

7. The electronic device according to claim 1, wherein the circuitry is further configured to:
receive a user input indicative of the first set of positions in the textual information; and
determine the first set of positions in the textual information based on the received user input.

8. The electronic device according to claim 1, wherein the circuitry is further configured to:
determine user profile information associated with a first user, the user profile information comprises preferences of the first user to insert the audio file of the first set of audio files, a genre of a scene to insert the audio file, or historical data related to the audio file; and determine, by the AI engine, the first set of audio files for the first set of scenes, based on the determined user profile information.

9. The electronic device according to claim 1, wherein the circuitry is further configured to:
compare, by the AI engine, one or more features from the first plurality of features and the second plurality of features with a third plurality of features of a plurality of audio files stored in an audio database, wherein the third plurality of features comprises at least one of lyrics information, an emotion, a sentiment, a danceability, a language, a popularity, acoustics, a loudness, a speechiness, a liveness, an occasion, the genre, instrument information, a tempo, a singer name, a music composer name, or a gender of the singer of the plurality of audio files; and
determine the first set of audio files from the plurality of audio files stored in the audio database based on the comparison.

10. The electronic device according to claim 1, wherein the circuitry is further configured to:
receive user input indicative of a selection of the first set of scenes from the plurality of scenes for which the first set of audio files are to be inserted; and
determine, by the artificial intelligent (AI) engine, the first set of audio files for the first set of scenes based on the received user input.

11. The electronic device according to claim 1, wherein the circuitry is further configured to:
receive the video content associated with the textual information;
determine one or more features of the first plurality of features and the second plurality of features from a plurality of image frames associated with the plurality of scenes of the received video content;
determine a second set of positions in the received video content based on the determined one or more features, wherein a second set of audio files are to be inserted at the determined second set of positions which are related to a second set of scenes of the plurality of scenes;
determine, by the AI engine, the second set of audio files for the second set of scenes based on the determined one or more features; and
control the display device to display the first information corresponding to the determined second set of positions and the second information corresponding to the determined second set of audio files.

12. The electronic device according to claim 11, wherein the determined one or more features further comprise at least one of a relationship between characters in the scene, an emotional state of the characters in the scene, or a geo-location of the scene.

13. The electronic device according to claim 11, wherein the circuitry is further configured to:
determine scene emotion quotient information for the second set of scenes in the received video content, based on the determined one or more features of the plurality of first features and the plurality of second features;
generate, by the AI engine, lyrics information and an audio signal associated with the lyrics information for at least one of the second set of audio files based on the determined scene emotion quotient information; and
control the display device to display third information corresponding to the generated lyrics information for the at least one of the second set of audio files.

14. The electronic device according to claim 11, wherein the circuitry is further configured to:
    compare the first set of positions in the textual information, and the second set of positions in the received video content; and
    determine, by the AI engine, the first set of audio files based on the comparison.

15. The electronic device according to claim 1, wherein the circuitry is further configured to:
    generate, by the AI engine, a third set of audio files for the first set of scenes based on one or more features of the first plurality of features and the second plurality of features related to the first set of scenes; and
    control the display device to display third information corresponding to the generated third set of audio files.

16. The electronic device according to claim 1, wherein the circuitry is further communicatively coupled with one or more image sensors to capture a plurality of image frames related to a plurality of shots of a scene, and the circuitry is further configured to:
    determine one or more features of the first plurality of features and the second plurality of features from the plurality of shots of the scene related to the captured plurality of image frames;
    determine a third set of positions in the plurality of shots of the scene based on the determined one or more features, wherein a fourth set of audio files are to be inserted at the determined third set of positions which are related to a set of shots of the scene from the plurality of shots; and
    determine, by the AI engine, the fourth set of audio files for the set of shots scenes, based on the determined one or more features.

17. The electronic device according to claim 16, wherein the circuitry is further configured to generate, by the AI engine, recommendations associated with the capture of the plurality of image frames related to the plurality of shots of the scene, based on the determined fourth set of audio files.

18. An electronic device, comprising:
    circuitry configured to:
        receive video content that includes a plurality of image frames associated with a plurality of scenes;
        determine one or more features from the plurality of image frames associated with the plurality of scenes of the received video content;
        determine a second set of positions in the received video content based on the determined one or more features for the plurality of scenes, wherein a second set of audio files are to be inserted at the determined second set of positions which are related to a second set of scenes of the plurality of scenes;
        determine scene analysis quotient information for each scene of the second set of scenes based on the determined first plurality of features for the plurality of scenes;
        determine a genre of an audio file to be inserted for each scene of the second set of scenes based on determined the scene analysis quotient information;
        determine, by the AI engine, the second set of audio files for the second set of scenes, based on the determined genre and the determined one or more features; and
        control a display device to display first information corresponding to the determined second set of positions and second information corresponding to the determined second set of audio files.

19. The electronic device according to claim 18, wherein the circuitry is further configured to:
    generate, by the AI engine, lyrics information and an audio signal associated with the lyrics information for each of a third set of audio files for the second set of scenes based on the determined one or more features for the second set of scenes; and
    control the display device to display third information corresponding to the generated lyrics information for each of the third set of audio files.

20. A method, comprising:
    in an electronic device:
        receiving textual information that indicates a plurality of scenes for video content;
        determining a first plurality of features for the plurality of scenes indicated by the textual information;
        determining a first set of positions in the textual information based on the determined first plurality of features for the plurality of scenes, wherein a first set of audio files are to be inserted at the determined first set of positions which are related to a first set of scenes of the plurality of scenes;
        determining scene analysis quotient information for each scene of the first set of scenes based on the determined first plurality of features for the plurality of scenes;
        determining a genre of an audio file to be inserted for each scene of the first set of scenes based on determined the scene analysis quotient information;
        determining, by an artificial intelligent (AI) engine, the first set of audio files for the first set of scenes, based on the determined genre, a second plurality of features and the first plurality of features related to the first set of scenes; and
        controlling a display device to display first information corresponding to the determined first set of positions and second information corresponding to the determined first set of audio files.

21. A non-transitory computer-readable medium having stored thereon, computer-executable instructions that when executed by an electronic device, causes the electronic device to execute operations, the operations comprising:
    receiving textual information that indicates a plurality of scenes for video content;
    determining a first plurality of features for the plurality of scenes indicated by the textual information;
    determining a first set of positions in the textual information based on the determined first plurality of features for the plurality of scenes, wherein a first set of audio files are to be inserted at the determined first set of positions which are related to a first set of scenes of the plurality of scenes;
    determining scene analysis quotient information for each scene of the first set of scenes based on the determined first plurality of features for the plurality of scenes;
    determining a genre of an audio file to be inserted for each scene of the first set of scenes based on determined the scene analysis quotient information;
    determining, by an artificial intelligent (AI) engine, the first set of audio files for the first set of scenes, based on the determined genre, a second plurality of features and the first plurality of features related to the first set of scenes; and controlling a display device to display first information corresponding to the determined first set of positions and second information corresponding to the determined first set of audio files.

\* \* \* \* \*